(12) United States Patent
Matsuzawa et al.

(10) Patent No.: US 11,758,304 B2
(45) Date of Patent: Sep. 12, 2023

(54) IMAGE SENSOR

(71) Applicant: TECH IDEA CO., LTD., Kanagawa (JP)

(72) Inventors: Akira Matsuzawa, Kanagawa (JP); Hirofumi Sumi, Tokyo (JP)

(73) Assignee: TECH IDEA CO., LTD., Kanagawa (JP)

( * ) Notice: Subject to any disclaimer, the term of this patent is extended or adjusted under 35 U.S.C. 154(b) by 175 days.

(21) Appl. No.: 17/252,278

(22) PCT Filed: Aug. 21, 2019

(86) PCT No.: PCT/JP2019/032573
§ 371 (c)(1),
(2) Date: Dec. 15, 2020

(87) PCT Pub. No.: WO2020/070994
PCT Pub. Date: Apr. 9, 2020

(65) Prior Publication Data
US 2021/0266486 A1    Aug. 26, 2021

(30) Foreign Application Priority Data

Oct. 1, 2018  (JP) ................................ 2018-186486

(51) Int. Cl.
*H04N 25/75* (2023.01)
*H04N 25/59* (2023.01)
(Continued)

(52) U.S. Cl.
CPC ........... *H04N 25/75* (2023.01); *H04N 25/443* (2023.01); *H04N 25/59* (2023.01); *H04N 25/65* (2023.01); *H04N 25/771* (2023.01)

(58) Field of Classification Search
CPC .. H04N 5/3454; H04N 5/3456; H04N 5/3559; H04N 5/363; H04N 5/37452;
(Continued)

(56) References Cited

U.S. PATENT DOCUMENTS

2008/0211950 A1    9/2008  Ono et al.
2013/0284892 A1   10/2013  Kyushima et al.
(Continued)

FOREIGN PATENT DOCUMENTS

JP    2003143485 A    5/2003
JP    2003250094 A    9/2003
(Continued)

OTHER PUBLICATIONS

Sugawa et al., "A 100dB Dynamic Range CMOS Image Sensor Using a Lateral Overflow Integration Capacitor", ISSCC (IEEE International Solid-State Circuits Conference) Digest of Technical Papers, IEEE, Feb. 8, 2005, pp. 352-353, 3pp.
Nishimura et al., "An Over 120dB Simultaneous-Capture Wide-Dynamic-Range 1.6e Ultra-Low-Reset-Noise Organic-Photoconductive-Film CMOS Image Sensor", ISSCC Digest of Technical Papers, IEEE, Feb. 1, 2016, pp. 110-111, 3pp.

*Primary Examiner* — Daniel M Pasiewicz
(74) *Attorney, Agent, or Firm* — HAUPTMAN HAM, LLP

(57) ABSTRACT

An image sensor capable of obtaining a high dynamic range without reducing a frame rate. An image sensor includes a pixel region where a plurality of pixels each including a sensor element that detects a naturally occurring physical quantity and converts the physical quantity into an electric signal are arranged in a row direction and a column direction, a row selection unit that selects any of the pixels in the pixel region in units of rows and contributes to readout of the electric signal from each of the pixels and resetting of an accumulated charge, a pixel readout unit that reads out the electric signal from each of the pixels selected by the row selection unit in column-parallel, and a column selection (Continued)

unit that selects the pixel in any column from a pixel row selected by the row selection unit and controls a charge accumulation amount of the selected pixel.

10 Claims, 36 Drawing Sheets

(51) Int. Cl.
*H04N 25/65* (2023.01)
*H04N 25/443* (2023.01)
*H04N 25/771* (2023.01)

(58) Field of Classification Search
CPC ........ H04N 5/378; H04N 23/75; H04N 23/78; H04N 25/443; H04N 25/59; H04N 25/65; H04N 25/771
See application file for complete search history.

(56) References Cited

U.S. PATENT DOCUMENTS

| | | |
|---|---|---|
| 2013/0308044 A1 | 11/2013 | Mitsunaga |
| 2015/0181149 A1 | 6/2015 | Awatani et al. |
| 2017/0315245 A1 | 11/2017 | Yamazaki |
| 2021/0006738 A1* | 1/2021 | Matsui .................. H04N 5/378 |

FOREIGN PATENT DOCUMENTS

| | | |
|---|---|---|
| JP | 2006295231 A | 10/2006 |
| JP | 2012151551 A | 8/2012 |
| JP | 2012175234 A | 9/2012 |
| JP | 2015119385 A | 6/2015 |
| JP | 2017200135 A | 11/2017 |
| KR | 10-2010-0033399 | 3/2010 |
| WO | 2014065055 A1 | 5/2014 |

* cited by examiner

IMAGE SENSOR

RELATED APPLICATIONS

The present application is a National Phase of International Application Number PCT/JP2019/032573, filed Aug. 21, 2019, which claims priority to Japanese Application Number 2018-186486, filed Oct. 1, 2018.

TECHNICAL FIELD

The present invention relates to an image sensor.

BACKGROUND ART

An image sensor has been used in large amounts for many applications such as not only a smartphone but also a drive recorder, an electronic mirror, automatic driving, a robot, and an endoscope, and the applications have been expected to continue to expand in the future. Although the image sensor has been so far improved in resolution and image quality to draw closer to human eyes, high-speed recognition and judgment that cannot be performed by human eyes, like object recognition and moving object recognition, can also be required in the future.

FIG. 29 is a block diagram illustrating a configuration of a CMOS (complementary metal oxide semiconductor) image sensor as a conventional typical image sensor. As illustrated in FIG. 29, in a CMOS image sensor 100, a plurality of pixels 101 are arranged in two dimensions in a row direction and a column direction. A row selection circuit 102 selects pixels in units of rows, and pixels (readout pixels) 101a selected by the row selection circuit 102 simultaneously output voltages respectively corresponding to illuminances of lights detected by the pixels.

A column readout circuit 103 converts the voltage outputted from each of the pixels into a digital value, and includes an analog-to-digital converter (hereinafter referred to as an A/D converter). A signal obtained by the conversion by the column readout circuit 103 is sequentially outputted via a transfer circuit 104. A pulse generation circuit 105 receives a clock signal and generates a timing signal required for an operation. The generated timing signal is inputted to the row selection circuit 102, the column readout circuit 103, and the transfer circuit 104.

FIG. 30 is an explanatory diagram of control of a charge accumulation time period in the conventional CMOS image sensor 100, and FIG. 31 is a diagram illustrating a readout timing and a reset timing. As illustrated in FIG. 30, in the conventional CMOS image sensor 100, voltages are respectively read out of pixels in descending order of positions of the pixels in the drawing. At a timing where the readout pixels 101a are read out, pixels (reset pixels) 101b below the readout pixels 101a by two rows are reset.

As illustrated in FIG. 31, the conventional CMOS image sensor performs resetting at a timing slightly before readout, to reset an accumulated charge once and start to accumulate the charge again. In this method, an accumulation time period is short, and a signal amount is reduced. Accordingly, a good image quality is also obtained without the charge being saturated for a signal having a high illuminance. However, only the same charge accumulation time period can be implemented in a frame. Accordingly, a frame for low illuminance where resetting is not performed and a frame for high illuminance where resetting is performed need to be usually alternately repeated.

Thus, in the conventional CMOS image sensor 100, the pixels and parameters of the column readout circuit 103 have been uniformly set. Accordingly, a performance is limited. Specifically, the conventional image sensor has a problem that an accumulated charge is not optimized and a required dynamic range cannot be ensured because a charge accumulation time period and a charge accumulation capacity are not optimized for each of the pixels.

The image sensor is required to accurately acquire sensing information having a large dynamic range. In a photodiode, for example, a dynamic range in normal shooting is 60 to 80 dB. However, in shooting of a tunnel exit or the like at the time of backlight or at the time of fine weather, a significantly high dynamic range of 120 to 150 dB is required.

To cope with image pickup under such a severe condition, various methods have been conventionally proposed (see Patent Literatures 1 and 2 and Non-Patent Literatures 1 and 2). Among them, a typical method is a method of respectively picking up images of frames in two types of different exposure time periods described in Patent Literature 1 and synthesizing signals obtained by the image pickup (a low-illuminance signal and a high-illuminance signal) to enlarge a dynamic range. FIGS. 32A and 32B are diagrams each illustrating signals acquired in the method described in Patent Literature 1, where FIG. 32A illustrates a signal in a frame for low illuminance, and FIG. 32B illustrates a signal in a frame for high illuminance FIG. 33 is a diagram illustrating a configuration of each of the frame for low illuminance and the frame for high illuminance.

As illustrated in FIGS. 32A and 32B, a period between a reset signal and a reset signal in the photodiode is a signal charge accumulation time period. A signal voltage obtained at each of pixels is proportional to a product of an illuminance and the signal charge accumulation time period. Thus, a dynamic range can be enlarged by controlling the signal charge accumulation time period. In the conventional image sensor, the signal charge accumulation time period is controlled in units of frames, a frame for low illuminance 110 where an accumulation time period is long and a frame for high illuminance 111 where an accumulation time period is short are alternately outputted, as illustrated in FIG. 33, and respective signals in the two frames are synthesized, to obtain an appropriate image.

Another method of enlarging a dynamic range has been proposed. FIG. 34 is a circuit diagram for enlarging a dynamic range used in a conventional image sensor. In a circuit illustrated in FIG. 34, a capacitance 121 having a large capacity of several hundred femtofarads to several picofarads is also provided for a high-illuminance signal in addition to a normal floating diffusion capacitance (1-D capacitance) 122 as a capacitance that converts an accumulated charge of a photodiode 120 generated by light into a voltage. In the circuit, appropriate readout of a signal is required for capacitance selection. Accordingly, a frame for low illuminance using the FD capacitance 122 and a frame for high illuminance using the capacitance 121 having a large capacity are alternately outputted for simplicity.

FIG. 35 is a diagram illustrating a pixel configuration for enlarging a dynamic range used in the conventional image sensor. A pixel 130 illustrated in FIG. 35 includes a pixel for low illuminance 131 having a large area and a pixel for high illuminance having a small area. In the pixel 130, a capacitance that converts a charge into a voltage as needed includes a small capacitance and a large capacitance, to enable output of a signal suitable for low-illuminance signal and a signal suitable for high-illuminance signal.

Further, Patent Literature 2 discloses an image sensor capable of selectively performing an electronic shutter operation for a region having any shape in a pixel region. FIG. 36 is a diagram illustrating the outline of the image sensor described in Patent Literature 2. In an image sensor 200 illustrated in FIG. 36, a scanner for charge transfer 201 that extracts a signal and a scanner for electronic shutter 202 that resets an accumulated charge are provided in a vertical direction, and a horizontal direction pixel selection scanner 203 is arranged in a horizontal direction.

In the image sensor 200, a timing signal is inputted to the scanner for charge transfer 201 and the scanner for electronic shutter 202 from a timing signal generation circuit 204. A logical product of a signal outputted from the scanner for electronic shutter 202 and an external input signal is taken, to select a pixel in a pixel region 205. A pixel is selected in the horizontal direction by the horizontal direction pixel selection scanner 203.

FIG. 37 is a diagram illustrating a unit pixel structure of the image sensor 200 illustrated in FIG. 36. In a pixel 210 illustrated in FIG. 37, a signal of HSEL(m−1) first becomes "H" before a signal of an m-th pixel is read out, a reset transistor Tr in the m-th pixel operates, and a voltage of a floating diffusion node FD rises to a reset level. Then, a signal of HSS(m) becomes "H" and a signal of VSOUT(n) becomes "H", a transfer control transistor Ty is turned on, and a signal at a reset level of a pixel (n, m) is extracted outward as a signal output, and is used as a reference signal for CDS (correlated double detection).

Then, HSEL(m−1) becomes "L", and HSEL(m) becomes "H". When VSEL(n) becomes "H" in this state, a transistor Txy is turned on, and a charge accumulated in a photodiode PD is discharged to the floating diffusion node FD via a transistor Tt. A signal at a level of the pixel (n, m) buffered by a transistor Ta constituting a source follower is extracted outward as a signal output, and is used as a signal for DS (correlated double detection).

On the other hand, at the time of resetting a charge for an electronic shutter, a logical product of a signal of the scanner for electronic shutter 202 and an external input signal is taken, to be a signal VSEL(n). For a reset target, VSEL(n) is "H", and VSOUT(n) is "L". When HSEL(m) becomes "H", the transistor Txy is turned on when VSEL(n) is "H", and a charge accumulated in the photodiode PD is discharged to the floating diffusion node FD via the transistor Tt.

At this time, although a voltage corresponding to a charge so far accumulated appears in SIG(n), the voltage does not appear in an output signal because VSOUT(n) is "L". In a subsequent horizontal selection operation, HSEL(m) becomes "L". Thus, the transistor Txy is turned off regardless of a logical state of VSEL(n), and the photodiode PD starts to accumulate a charge corresponding to a light amount. The image sensor 200 can selectively perform an electronic shutter operation for a region having any shape of the pixel region 205 when the VSEL signal is synchronized with a horizontal direction pixel selection scan signal to modulate the external input signal at the same speed based on the foregoing operation.

CITATION LIST

Patent Literature

Patent Literature 1
Japanese Patent Laid-Open No. 2003-250094 Patent Literature 2
Japanese Patent Laid-Open No. 2003-143485

Non Patent Literatures

Non Patent Literature 1
S. Sugawa, et al., "A 100 dB dynamic range CMOS image sensor using a lateral overflow integration capacitor", ISSCC (IEEE International Solid-State Circuits Conference) Digest of Technical Papers, IEEE, February 2005, pp. 352-353 Non Patent Literature 2
K. Nishimura, et al., "An Over 120 dB Simultaneous-Capture Wide-Dynamic-Range 1.6e -Ultra-Low-Reset-Noise Organic Photoconductive-Film CMOS Image Sensor", ISSCC Digest of Technical Papers, IEEE, February 2016, pp. 110-111

SUMMARY OF INVENTION

Technical Problem

However, the above-described method of synthesizing signals that are respectively exposed in different time periods has problems that the method cannot be applied to high-speed image pickup because an effective frame rate is halved and a signal-to-noise ratio (S/N ratio) of an image decreases because an accumulation time period for a signal in a frame for low illuminance is halved.

To solve the problems to make the effective frame rate the same as that in a conventional example, a signal may be processed and transmitted at a doubled data rate. However, this is not practical because the number of pixels and the frame rate need to be increased. In an image sensor corresponding to 8K, for example, when the number of frames is 60 per second, and the resolution of an A/D converter is set to 12 bits, the data rate of an output signal is approximately 24 gigabits per second. Accordingly, it is difficult to increase the data rate of the output signal any more.

A method using a circuit illustrated in FIG. 34 has a problem that a capacitance for high-illuminance signal is difficult to integrate as the size of a pixel is reduced in addition to the above-described problems. Further, a method using a pixel configuration illustrated in FIG. 35 is not preferable from the viewpoint of higher speed and lower power consumption because two sets of signals are outputted from a pixel so that a pixel signal processing circuit, such as an A/D converter, is doubled and a data output rate from an image sensor is doubled. Accordingly, if a frame for low illuminance and a frame for high illuminance using a large capacitance are alternately outputted, there is a similar problem to those in the two methods previously described. Further, a method of enlarging the dynamic range based on an area of a pixel illustrated in FIG. 35 is difficult to apply as the pixel is reduced.

On the other hand, a method of selectively performing an electronic shutter operation for a region having any shape of a pixel region is not preferable from the viewpoint of power consumption, settling, and noise because a vertical pixel selection signal varies at a high frequency, like in the image sensor described in Patent Literature 2. Assuming that the number of pixels is $N_H$ in a horizontal direction and $N_V$ in a vertical direction, and the number of frames is $F_{fl}$, for example, an operation frequency of a vertical selection signal VSEL is $F_{fl} \times N_V$ when the vertical selection signal is not modulated in response to an external input signal. On the other hand, the maximum operation frequency of the vertical selection signal VSEL is $F_{fl} \times N_V \times (N_H/2)$ when the vertical selection signal VSEL has been modulated in response to the external input signal. Therefore, the maximum operation frequency of the vertical selection signal VSEL when the vertical selection signal VSEL has been modulated in response to the external input signal increases ($N_H/2$) times.

If the number of frames $F_{fl}$ is set to 60 per second, operation frequencies of vertical selection signals VSEL of a full high definition ($N_H$=2000 and $N_V$=1000), a 4K camera ($N_H$=4000 and $N_V$=2000), and a 8K camera ($N_H$=8000 and $N_V$=4000) are respectively 60 MHz, 240 MHz, and 960 MHz when the vertical selection signal VSEL has been modulated in response to the external input signal, although 60 kHz, 120 kHz, and 240 kHz when the vertical selection signal VSEL is not modulated in response to the external input signal.

Although power consumption of each of pixels is proportional to a product of respective squares of a capacity, an operation frequency, and a voltage amplitude, several thousands of transistors are connected to each of the vertical selection signals VSEL, to swing the vertical selection signal VSEL with an amplitude of approximately 3 volts. Accordingly, the power consumption significantly increases, to reach thousands of times higher than when the vertical selection signal VSEL is not modulated in response to the external input signal. Further, in this method, an analog characteristic deteriorates due to deterioration in settling characteristic, a parasitic capacitance, a parasitic inductance, or the like. That is, the method of selectively performing an electronic shutter operation for a region having any shape of a pixel region, like in the image sensor described in Patent Literature 2, has a problem of significantly increasing an operation frequency and power consumption and deteriorating an analog characteristic, resulting in a deteriorated image quality. The problem becomes more serious when a resolution and a frame rate are increased.

In recent years, to implement automatic driving and enhance safety of an automobile, or perform face recognition, the image sensor has been actively used. In the applications, a large number of pixels and a high frame rate are required, while recognition needs to be reliably performed even in backlight, a tunnel exit, or the like. Accordingly, a high dynamic range is required.

Therefore, the present invention is directed to providing an image sensor capable of obtaining a high dynamic range without reducing a frame rate.

Solution to Problem

The inventors of the present invention have obtained the following knowledge as a result of intensive studies to solve the above-described problems. A structure of a current CMOS image sensor is affected by a configuration of a television screen, and the CMOS image sensor has a structure in which an image is picked up, read out, and transferred regularly and unilaterally by sequentially scanning pixels. Although control by an image read out has also been performed, the control has been performed uniformly over all pixels, like control of an average exposure time period, and control for each of the pixels has been unable to be performed in a conventional image sensor.

The inventors of the present invention have found that although a CMOS image sensor selects pixels for each of rows to simultaneously output and reset pixel signals in parallel for a pixel readout circuit in each of columns, control of an accumulated charge for each of the pixels can be performed, when the pixels are selected for each of the rows, if column information is provided to each of the pixels, leading to the present invention. According to this configuration, a charge accumulation amount can be controlled by changing a charge accumulation time period and a charge accumulation capacity for each of the pixels. Accordingly, a high dynamic range can be obtained by making the accumulated charge amount appropriate depending on the luminance of each of the pixels.

The inventors of the present invention have found that control can also be performed for each of columns for a pixel readout circuit corresponding to each of pixels. Specifically, when current consumption in the pixel readout circuit and the resolution of an A/D converter are controlled, power consumption of the pixel readout circuit corresponding to the pixel not required to be read out can be reduced. Further, the power consumption can be reduced while an image quality is improved by making the resolution of the A/D converter high when a pixel signal is small and making the resolution of the A/D converter low when the pixel signal is large. Further, when data of the pixel not required to be read out is not transferred, a data rate can be effectively reduced. Accordingly, an operation speed of an image processing circuit can be increased, and the power consumption including power consumption of a data transfer circuit can be reduced.

That is, an image sensor according to the present invention includes a pixel region where a plurality of pixels each including a sensor element that detects a naturally occurring physical quantity and converts the physical quantity into an electric signal are arranged in two dimensions in a row direction and a column direction, a row selection unit that selects any of the pixels in the pixel region in units of rows and contributes to readout of the electric signal from each of the pixels and resetting of an accumulated charge, a pixel readout unit that reads out the electric signal from each of the pixels selected by the row selection unit in column-parallel, and a column selection unit that selects the pixel in any column from a pixel row selected by the row selection unit and controls a charge accumulation amount of the selected pixel.

The column selection unit resets the accumulated charge for the pixel not selected, for example.

In the case, the pixel may include a MOS transistor having its source connected to a row selection line connected to the row selection unit and used to reset the accumulated charge, having its gate connected to a column selection line connected to the column selection unit, and having its drain connected to the gate of a transfer transistor that transfers an accumulated charge of a photodiode to a capacitance, and the MOS transistor may control the resetting of the accumulated charge.

Alternatively, the column selection unit can also transfer the accumulated charge of the pixel not selected to a capacitance.

In the case, the pixel may include a MOS transistor having its source connected to a row selection line connected to the row selection unit and used to transfer the accumulated charge, having its gate connected to a column selection line connected to the column selection unit, and having its drain connected to the gate of a transfer transistor that transfers an accumulated charge of a photodiode to a capacitance, and the MOS transistor may control the transfer of the accumulated charge.

Alternatively, the column selection unit may change a charge accumulation capacity of the selected pixel to control a charge accumulation amount.

The image sensor according to the present invention can also be configured such that a first row selection unit and a second row selection unit and a first column selection unit and a second column selection unit are respectively provided on the side in a row direction and on the side in a column direction with the pixel region sandwiched therebetween, each of the first row selection unit and the second row selection unit selects the pixels from an end on the side closer to the row selection unit to a center in the row direction among the pixels in the pixel region, and each of the first column selection unit and the second column selection unit selects the pixels from an end on the side closer to the column selection unit to a center in the column direction among the pixels in the pixel region.

The image sensor according to the present invention may be configured such that the column selection unit is provided with shift registers, a pixel control signal inputted to the column selection unit is transferred in the row direction by the shift registers, and column selection signals are simultaneously outputted, respectively, from the shift registers in response to a reading timing signal inputted to the column selection unit.

In the case, the column selection unit may stop transferring the signal by the shift registers, when a pixel control signal having a control code indicating that all the columns are not selected is inputted.

The image sensor according to the present invention may further include a pixel control signal generation unit that generates the pixel control signal, in which the pixel control signal generation unit may generate the pixel control signal by determining whether a previous output signal has a value that is a threshold value or more or is less than the threshold value, writing information about the determination into a memory in units of frames, and reading out the determination information from the memory in synchronization with a timing of the succeeding frame.

Alternatively, the image sensor according to the present invention can further include a pixel control signal generation unit that generates the pixel control signal, in which the pixel control signal generation unit can also generate the pixel control signal by determining whether a previous output signal has a value that is a threshold value or more or is less than the threshold value, writing information about the determination into a memory in units of frames, predicting motion of an object based on a difference between information about two or more continuous frames written into the memory, writing information corrected based on the predicted motion into the memory, and reading out the corrected information from the memory in synchronization with a timing of the succeeding frame.

Another image sensor according to the present invention includes a pixel region where a plurality of pixels each including a sensor element that detects a naturally occurring physical quantity and converts the physical quantity into an electric signal are arranged in two dimensions in a row direction and a column direction, a row selection unit that selects any of the pixels in the pixel region in units of rows and contributes to readout of an electric signal from each of the pixels, and a readout control unit that is provided with a readout circuit for each pixel column and reads out the electric signal from each of the pixels selected by the row selection unit in column-parallel and controls the readout circuit.

In the other image sensor, the readout control unit may selectively stop an operation of the readout circuit.

Alternatively, the readout control unit can also control the resolution of an analog-to-digital converter included in the readout circuit.

Alternatively, the readout control unit may control data transfer from an analog-to-digital converter included in the readout circuit.

Advantageous Effect of Invention

According to the present invention, each of pixels is individually controlled such that a charge accumulation amount of the pixel becomes appropriate. Accordingly, a dynamic range can be significantly enlarged without a frame rate being reduced.

BRIEF DESCRIPTION OF DRAWINGS

FIG. 12A is a block diagram of a logical circuit, and FIG. 12B is a flowchart.

FIG. 32A illustrates a signal in a frame for low illuminance, and FIG. 32B is a signal in a frame for high illuminance.

DESCRIPTION OF EMBODIMENTS

A mode for carrying out the present invention will be specifically described below with reference to the accompanying drawings. Note that the present invention is not limited to embodiments described below.

First Embodiment

Figure 1:
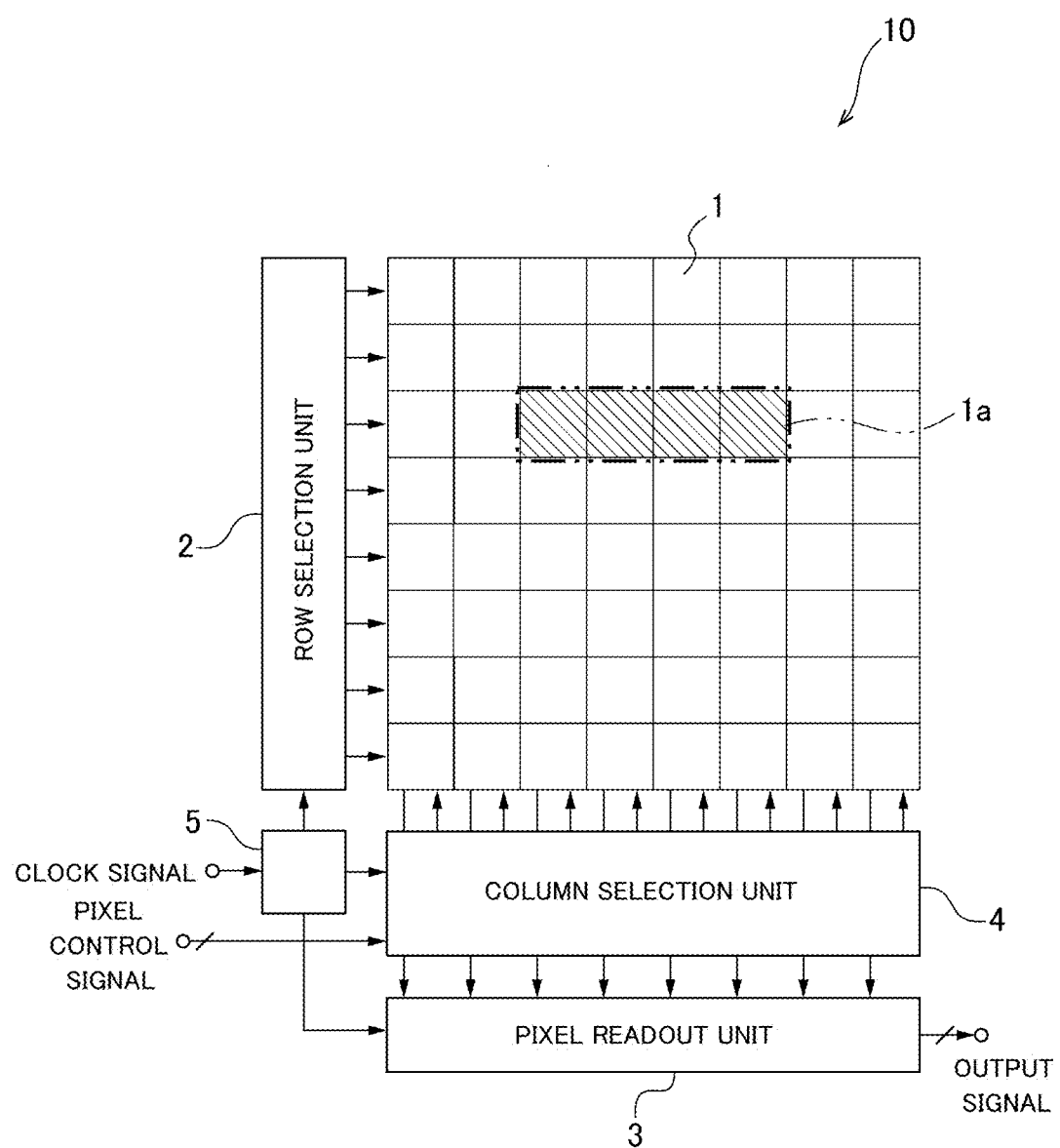
FIG. 1 is a block diagram illustrating a configuration of an image sensor according to a first embodiment of the present invention.

First, an image sensor according to a first embodiment of the present invention will be described. FIG. 1 is a block diagram illustrating a configuration of the image sensor according to the present embodiment. As illustrated in FIG. 1, the image sensor 10 according to the present embodiment is provided with a row selection unit 2, a pixel readout unit 3, a column selection unit 4, and a timing signal generation unit 5 around a pixel region where a plurality of pixels 1 are arranged in two dimensions in a row direction and a column direction.

[Pixel 1]

Each of the pixels 1 in the pixel region 1 includes a sensor element that detects a naturally occurring physical quantity and converts the physical quantity into an electric signal. The naturally occurring physical quantity means visible light, infrared light, ultraviolet light, X-rays, an electromagnetic wave, an electric field, a magnetic field, a temperature, pressure, and the like.

Figure 2:
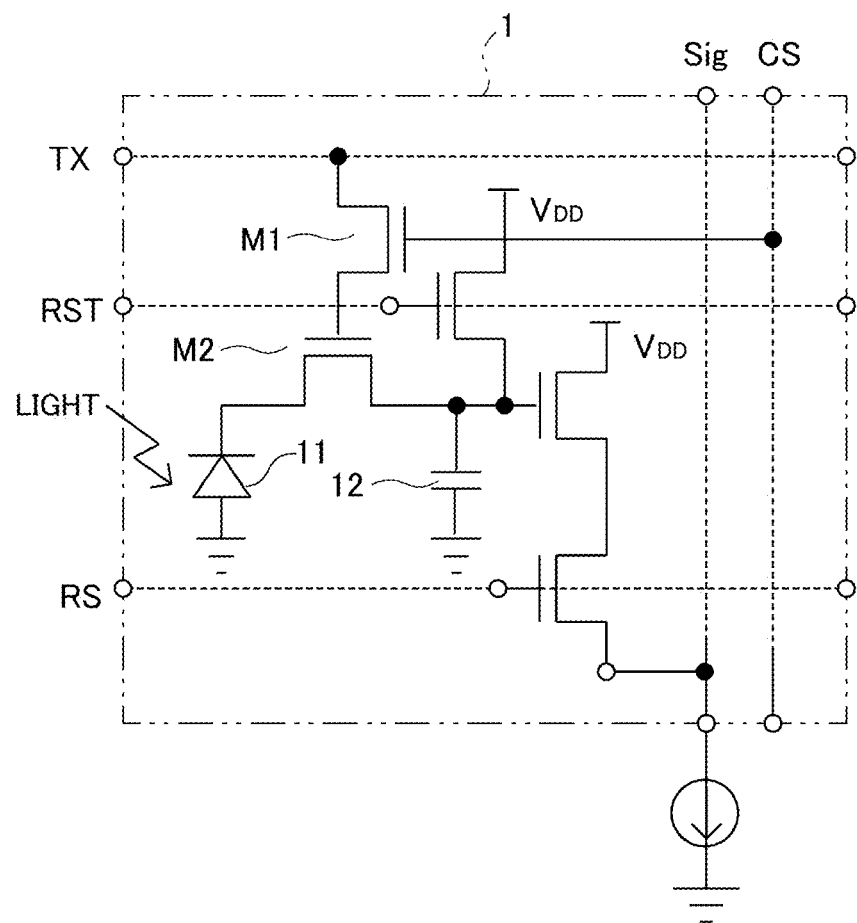
FIG. 2 is a circuit diagram illustrating a configuration example of a pixel 1 illustrated in FIG. 1.
Figure 3:
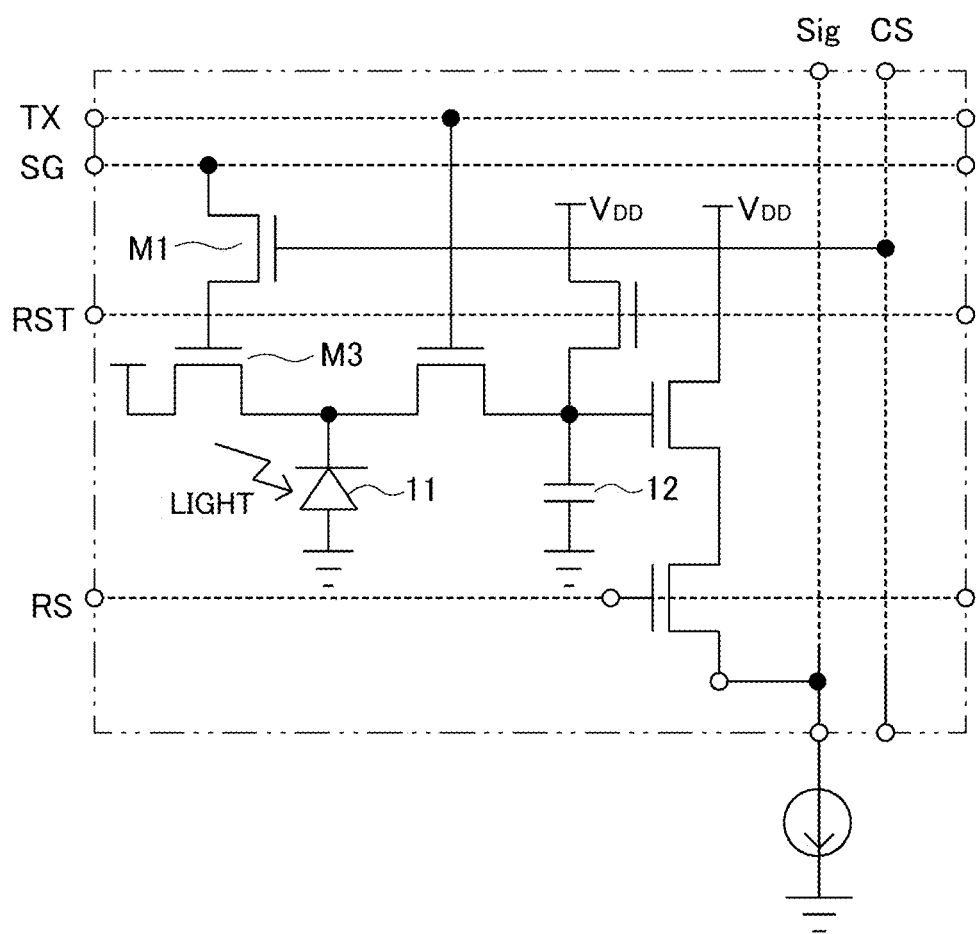
FIG. 3 is a circuit diagram illustrating another configuration example of the pixel 1 illustrated in FIG. 1.

A configuration of the pixel 1 is not particularly limited. However, for a CMOS sensor that detects visible light, for example, a configuration using a PIN photodiode and a complete transfer technique can be applied. FIGS. 2 and 3 are circuit diagrams each illustrating a configuration example of the pixel 1 in the image sensor 10 illustrated in FIG. 1. Specifically, the pixel 1 can be configured such that a transistor M1 and a control line CS provided for each of columns are added to a general pixel to control the gate of a transistor M2 that transfers a charge of a PIN photodiode 11 to an FU capacitance 12, as illustrated in FIG. 2. The pixel 1 may be configured such that a row selection line SG that resets an accumulated charge of a PIN photodiode 11 and a transistor M1 are provided to control the gate of a transistor M3 that resets an accumulated charge of the PIN photodiode 11, as illustrated in FIG. 3.

[Row Selection Unit 2]

The row selection unit 2 is connected to a row selection line provided for each of pixel rows, selects any of the pixels in the pixel region in units of rows and contributes to readout of an electric signal from each of the pixels and resetting of an accumulated charge, and is provided with a row selection circuit for each of the rows. A configuration of each of the row selection circuits in the row selection unit 2 is not particularly limited, but can be a similar configuration to that of a conventional image sensor.

[Pixel Readout Unit 3]

The pixel readout unit 3 reads out an electric signal from each of the pixels selected by the row selection unit 2 in column parallel, and is provided with an analog-to-digital conversion circuit that converts a voltage outputted from a pixel 1a into a digital value. A signal obtained by the conversion in the analog-to-digital conversion circuit in the pixel readout unit 3 is sequentially outputted to outside.

[Column Selection Unit 4]

Figure 4:
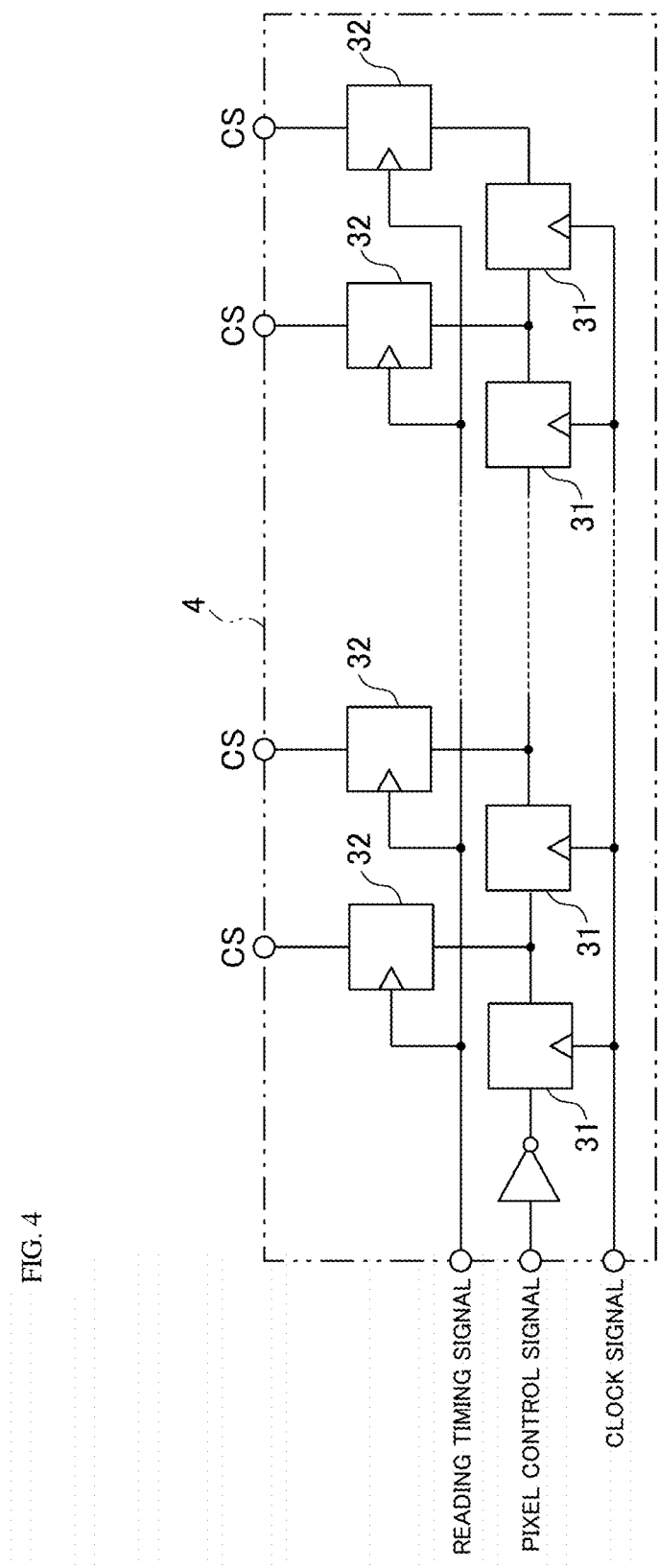
FIG. 4 is a circuit diagram illustrating a configuration example of a column selection unit 4 illustrated in FIG. 1.

The column selection unit 4 is connected to a column selection line provided for each of pixel columns, and selects the readout pixel 1a from the pixel row selected by the row selection unit 2 based on a pixel control signal inputted from outside and individually controls a charge accumulation amount of the selected pixel 1a. FIG. 4 is a circuit diagram illustrating a configuration example of the column selection unit 4. As illustrated in FIG. 4, the column selection unit 4 is provided with a plurality of flip-flops (F/F) 31 respectively forming shift registers that operate in synchronization with a clock signal for the pixel columns, and the flip-flops (F/F) 31 are connected in series.

The pixel control signal is inputted to the flip-flop (F/F) at a left end in the drawing, for example, is synchronized with the clock signal, and is sequentially transferred to the flip-flop (F/F) 31 on the right side in the drawing. Further, the column selection unit 4 is provided with flip-flips (F/F) 32 to be respectively registers of the flip-flips (F/F) 31, and signals for controlling the pixel 1a are simultaneously outputted, respectively, from the flip-flips (F/F) 32 based on a reading timing signal.

[Timing Signal Generation Unit 5]

A timing signal generation unit 5 generates a timing signal required for an operation based on the clock signal to be a reference and outputs the various types of timing signals and the clock signal to the row selection unit 2, the pixel readout unit 3, and the column selection unit 4, and includes a pulse generation circuit and the like. A configuration of the pulse generation circuit in the timing signal generation unit 5 is not particularly limited, but can be a similar configuration to that of the conventional image sensor.

[Operation]

Figure 5:
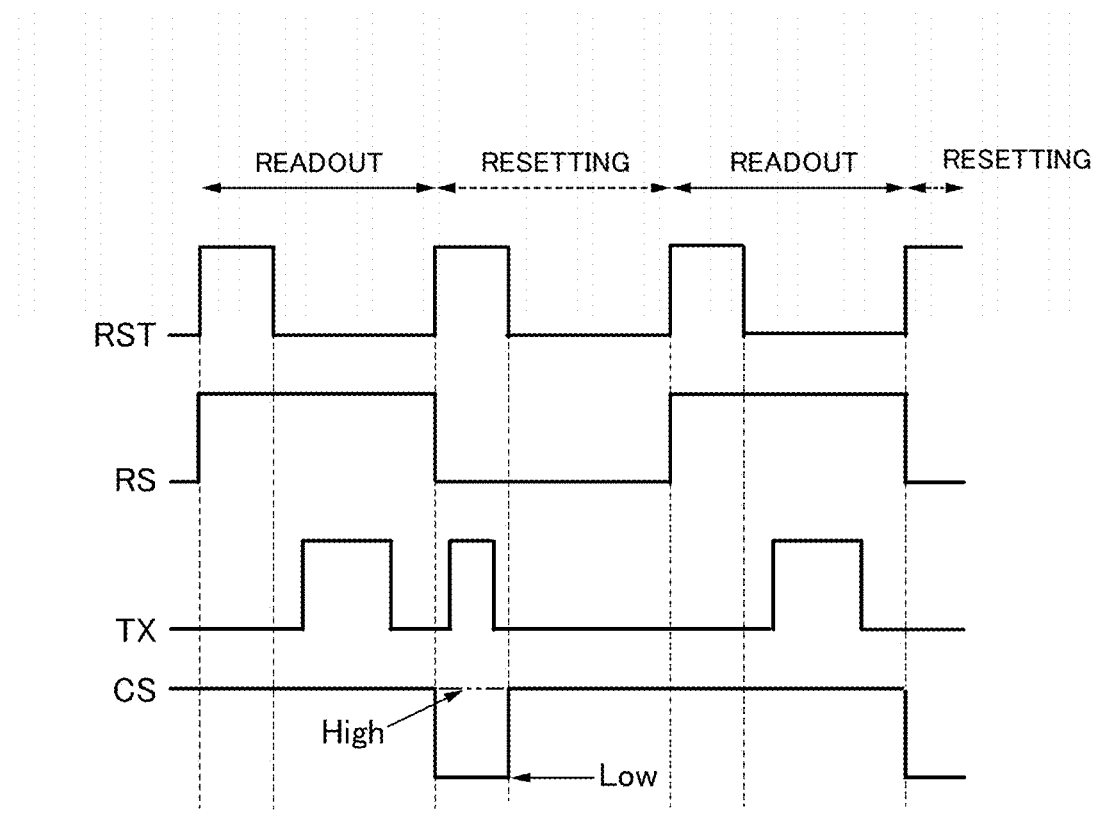
FIG. 5 is a diagram illustrating a method of controlling the pixel having a circuit configuration illustrated in FIG. 2.

Then, an operation of the image sensor 10 illustrated in FIG. 1 will be described using a case where a charge accumulation time period of each of the pixels is individually controlled as an example. FIG. 5 is a diagram illustrating a control method performed when the pixel 1 has a circuit configuration illustrated in FIG. 2. In an operation for reading out the pixel 1, an RST signal as one of a plurality of signals to be fed to the row selection line becomes high (hereinafter referred to as "H"), and a node of the FU capacitance 12 is raised to $V_{DD}$. At this time, an RS signal as one of the plurality of signals to be fed to the row selection line also becomes "H", and a signal at a reset level is fed as a Sig signal to the pixel readout circuit, and is used as a signal for correlated double detection (CDS).

Then, the RST signal becomes low (hereinafter referred to as "L"). After a while, a TX signal as one of the plurality of signals to be fed to the row selection line becomes "H", and a charge of the PIN photodiode 11 is transferred to the FD capacitance 12. The charge is converted into a voltage in the FD capacitance 12, and is fed as a Sig signal to the pixel readout unit 3. The Sig signal outputted from the FD capacitance 12 is used as a signal for correlated double detection (CDS), is converted into a digital signal in the analog-to-digital conversion circuit in the pixel readout unit 3 after a difference of the Sig signal from the signal at a reset level is taken, and is sequentially outputted to a signal output end.

In the above-described operation, a CS signal to be fed to the column selection line is "H", and the transistor M1 is turned on. Accordingly, the TX signal as one of the plurality of signals to be fed to the row selection line becomes "H", not to prevent the charge of the PIN photodiode 11 from being transferred to the FD capacitance 12.

On the other hand, in a charge reset operation to be performed to shorten the charge accumulation time period, the RST signal as one of the plurality of signals to be fed to the row selection line in the pixel row for which charge resetting is performed first becomes "H". At the same time, the CS signal to be fed to the column selection line in the pixel for which charge resetting is performed is made "H", and the CS signal to be fed to the column selection line in the pixel for which charge resetting is not performed is made "L". In this state, the TX signal as one of the plurality of signals to be fed to the row selection line at a slightly delayed timing is made "H".

The TX signal is connected to the gate of the transistor M2 that transfers the charge of the PIN photodiode 11 via the transistor M1 controlled based on the CS signal. Thus, when the CS signal is "H", the transistor M1 is turned on, an "H" voltage of the TX signal is applied to the gate of the transistor M2, and the transistor M2 is turned on. As a result, the charge accumulated in the PIN photodiode 11 is reset.

On the other hand, when the CS signal is "L", the transistor M1 is turned off, and a gate voltage of the transistor M2 remains being a voltage ("L" voltage) of the TX signal before the CS signal becomes "L". Thus, the transistor M2 is turned off, and the charge of the PIN photodiode 11 is not reset. In the above-described operation, the pixel for which an accumulated charge is reset is determined based on a logical product of the TX signal as one of the plurality of signals to be fed to the row selection line and the CS signal to be fed to the column selection line by using the transistor M1.

Then, the TX signal becomes "L", and the charge of the PIN photodiode 11 starts to be accumulated by incident light again. After a while, the RST signal becomes "L", and the CS signal becomes "H". Such a charge reset operation is performed while the RS signal is "L", and the CS signal is always "H" at the time of readout. Thus, a readout operation is not affected. The image sensor 10 according to the present embodiment can reset an accumulated charge only for the required pixel by the above-described operation.

Note that the same applies to a case where the pixel 1 has the circuit configuration illustrated in FIG. 3. Although the SG signal as one of the plurality of signals to be fed to the row selection line becomes "H" at a timing where the accumulated charge of the PIN photodiode 11 is reset, the CS signal may be made "L" at preceding and succeeding timings for the pixel for which resetting is not performed, and the CS signal may continue to be made "H" for the pixel for which resetting is performed. In the above-described operation, the pixel for which charge resetting is performed is selected based on a logical product of the SG signal as one of the plurality of signals to be fed to the row selection line and the CS signal to be fed to the column selection line by using the transistor M1.

Figure 6:
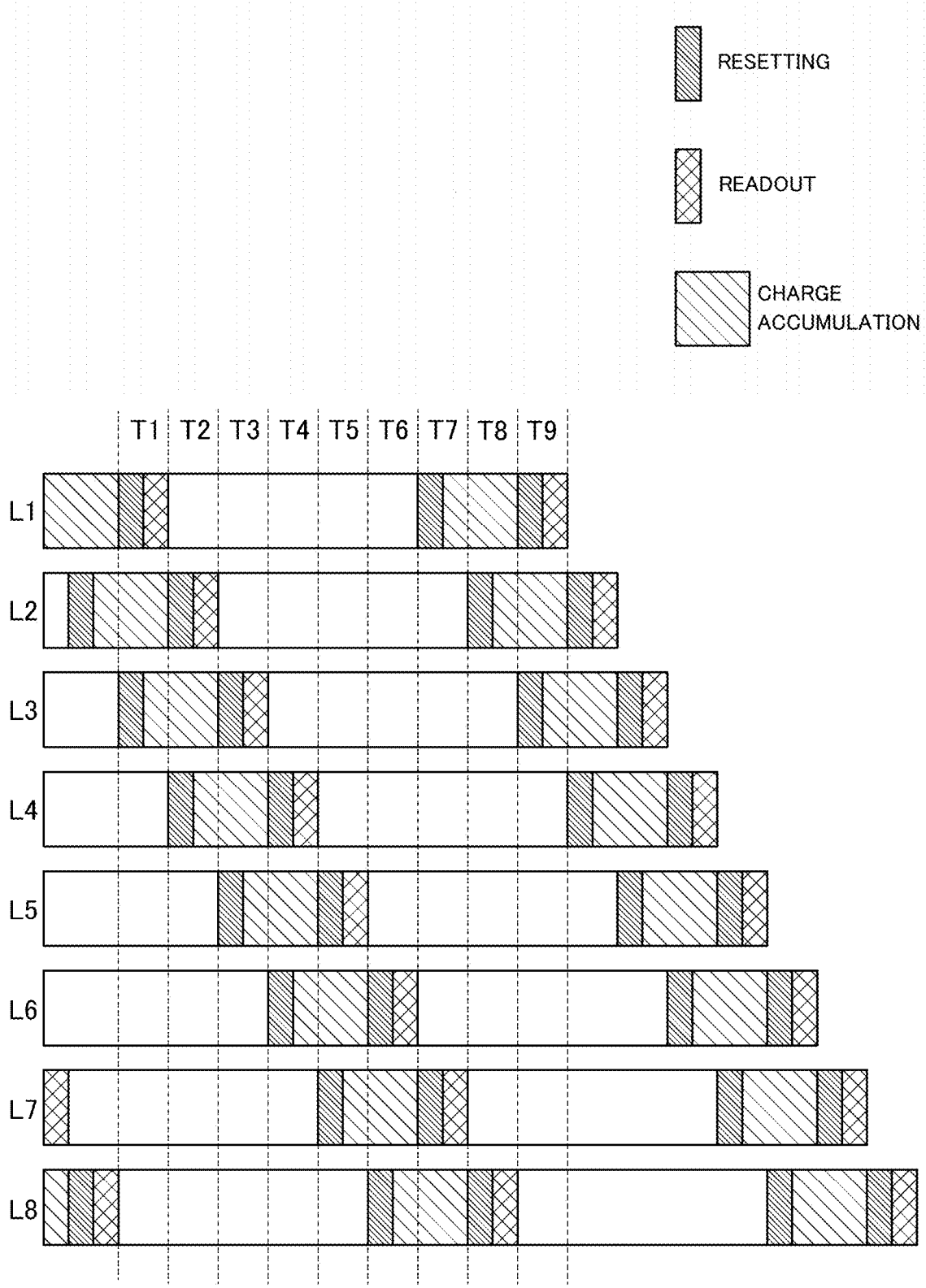
FIG. 6 is a diagram illustrating respective operation timings of rows in the image sensor according to the first embodiment of the present invention.

FIG. 6 is a diagram illustrating an operation timing of each of the rows in the image sensor 10 according to the present embodiment. Note that L1 to L8 illustrated in FIG. 6 are respectively numbers of pixel rows. The smaller a numeral in the pixel row is, the higher in the drawing the position of the pixel row is. As illustrated in FIG. 6, in the image sensor according to the present embodiment, resetting and signal readout are performed sequentially for the pixel rows L1 to L8, and a charge accumulation time period is controlled by the resetting so that a charge reset operation does not affect the signal readout.

In the image sensor 10 according to the present embodiment, the clock signal is inputted to the timing signal generation unit 5, and timing signals such as a reading timing signal and a DS timing signal required for an operation are generated. The timing signal and the clock signal generated by the timing signal generation unit 5 are inputted to the row selection unit 2, the pixel readout unit 3, and the column selection unit 4.

Figure 7:
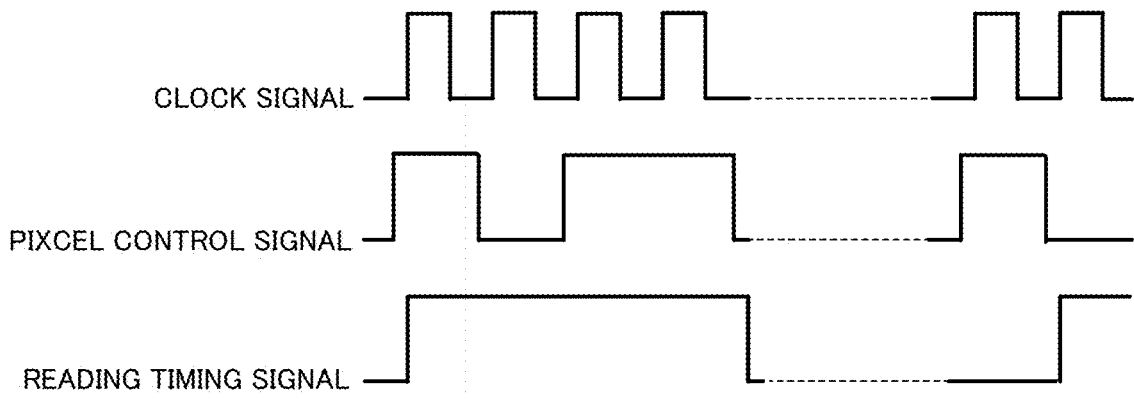
FIG. 7 is a diagram illustrating a timing chart of signals inputted to the column selection unit 4 illustrated in FIG. 1.

To the column selection unit 4, the pixel control signal, together with the clock signal and the reading timing signal, is inputted. The signals are inputted to the column selection unit 4 at a timing illustrated in FIG. 7, for example. On the other hand, the TX signal, the RS signal, and the RST signal, each of which sequentially selects pixels in each of the rows, are inputted to the row selection circuit in the row selection unit 2, and any of the pixels are selected in units of rows based on the signals.

As illustrated in FIG. 4, the pixel control signal is inputted to the flip-flop 31 that operates in synchronization with the clock signal, and is transferred to a stage on the right side in the drawing. The pixel control signal spreads over the flip-flops 31 in all the columns, and is then used to control the readout pixel 1a as CS signals to be simultaneously captured in the flip-flops 32 as respective registers in the columns at an edge of the reading timing signal and respectively fed to the column selection lines.

[Pixel Control when Incident Light has Low Illuminance]

Figure 8:
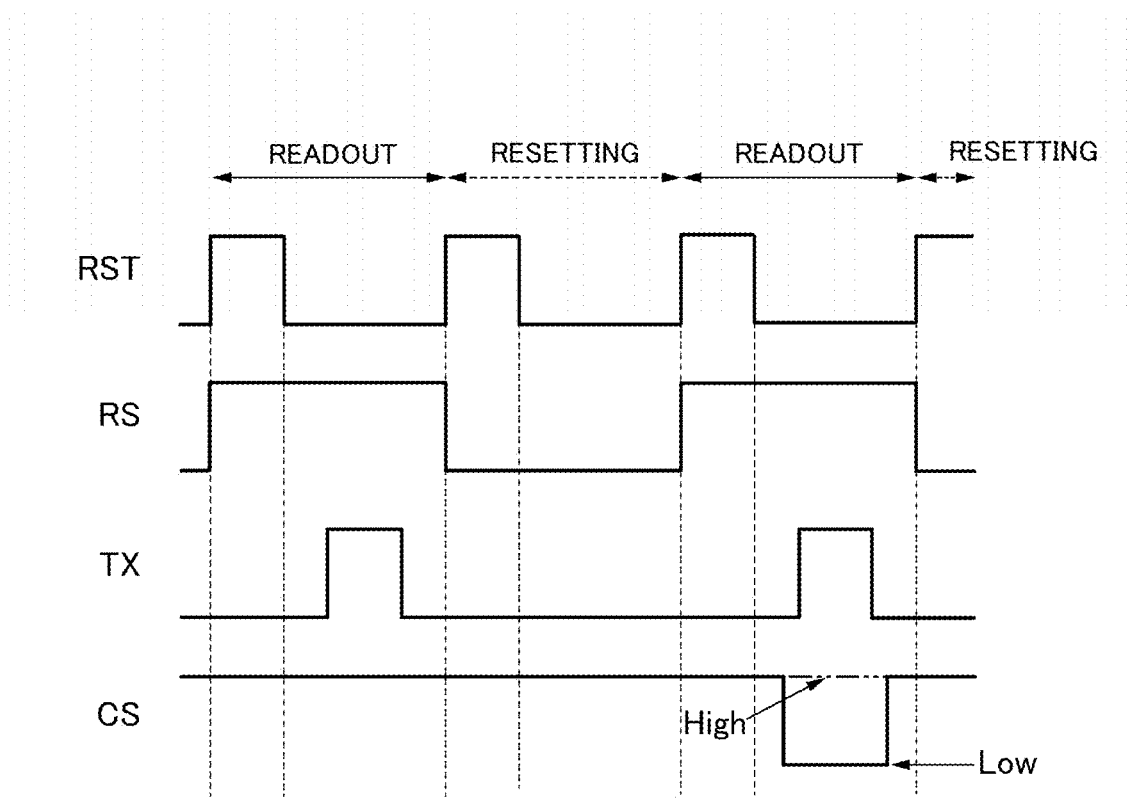
FIG. 8 is a diagram illustrating a method of controlling a pixel when incident light has a low illuminance.

Although a method of controlling a pixel when incident light has a high illuminance has been described above, the image sensor according to the present embodiment can also be applied to a case where incident light has a low illuminance A method of controlling a pixel when incident light has a low illuminance will be described below. FIG. 8 is a diagram illustrating a method of controlling a pixel when incident light has a low illuminance. When incident light has a low illuminance, the number of electrons to be stored is small. Accordingly, if a charge accumulation time period is not made long, an S/N ratio as a signal-to-noise ratio becomes low, resulting in a deteriorated image quality.

On the other hand, if an image hardly moves, an image quality can be improved by making an accumulation time period long. As illustrated in FIG. 8, in the image sensor 10 according to the present embodiment, even if a TX signal for transferring an accumulated charge of the PIN photodiode 11 is "H", a charge accumulation time period may be lengthened without transferring the accumulated charge of the PIN photodiode 11 to a capacitance by making a CS signal as a pixel control signal "L". According to the control method, the accumulated charge of the PIN photodiode 11 can be increased. Accordingly, even if incident light has a low illuminance, a high image quality can be ensured.

Figure 9:
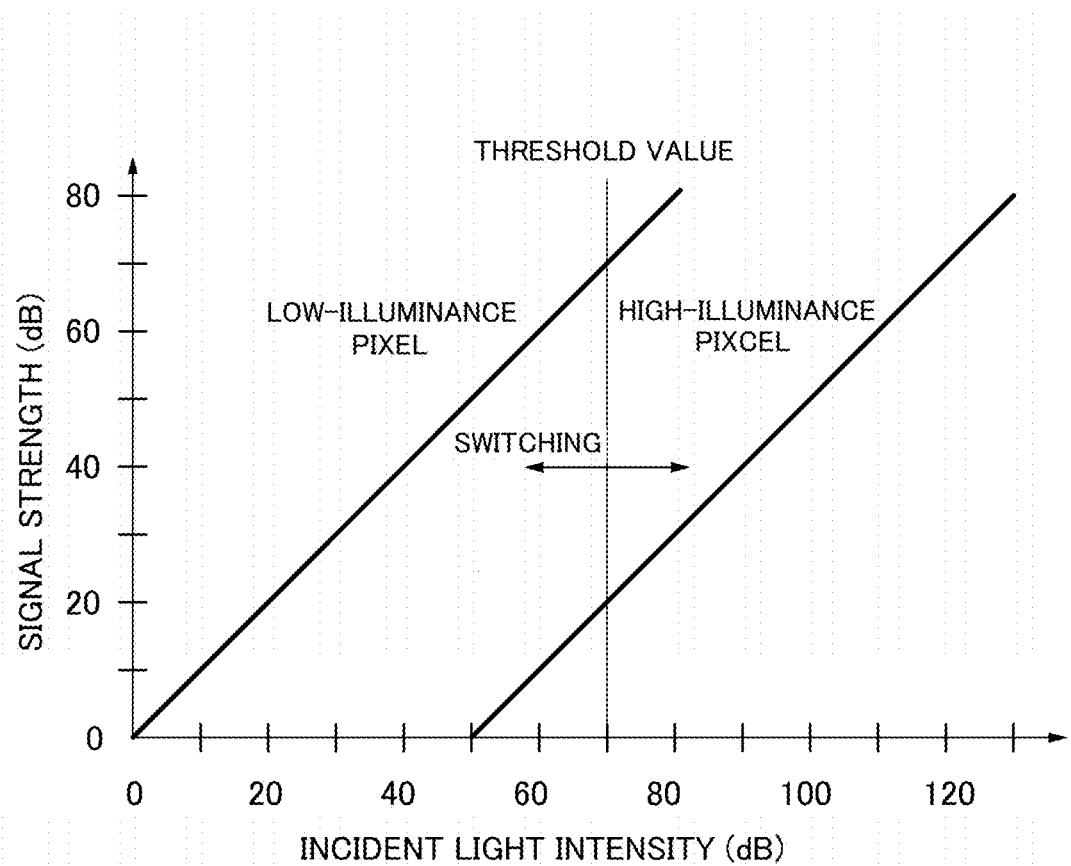
FIG. 9 is a diagram illustrating switching of a pixel in the image sensor according to the first embodiment of the present invention.

The pixel control signal mainly assumes a role of switching a low-illuminance pixel and a high-illuminance pixel. FIG. 9 is a diagram illustrating switching of pixels in the image sensor 10 according to the present embodiment. As illustrated in FIG. 9, in the image sensor 10 according to the present embodiment, if the dynamic range of the low-illuminance pixel is 80 dB, for example, a charge accumulation time period of the high-illuminance pixel is reduced by 50 dB, and the charge accumulation time period of the high-illuminance pixel is shortened to approximately one three-hundredth. Accordingly, when incident light on the low-illuminance pixel is 70 dB or more, the entire dynamic range is increased to 130 dB when the readout pixel 1a is controlled based on the pixel control signal such that the low-illuminance pixel is switched to the high-illuminance pixel.

Figure 10:
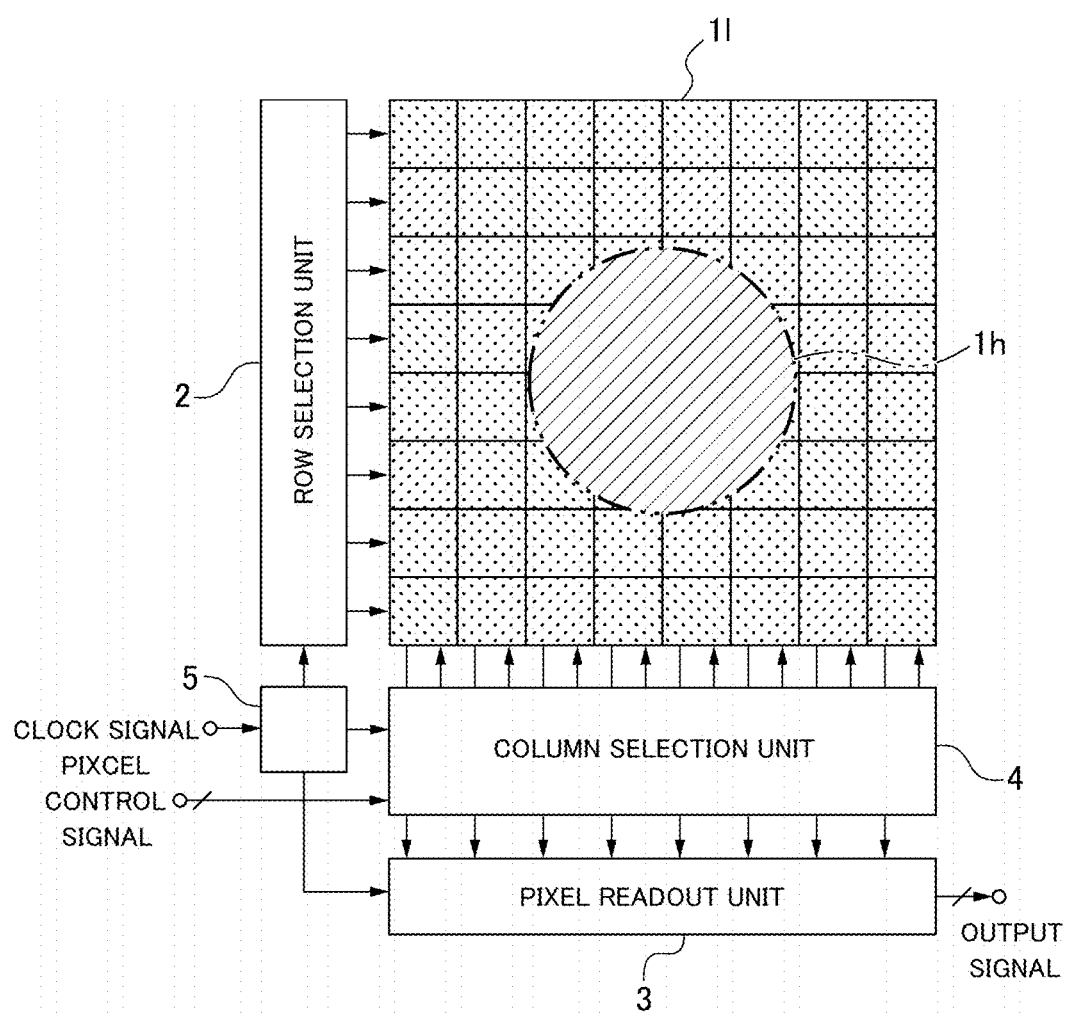
FIG. 10 is a diagram illustrating a high-illuminance region and a low-illuminance region in the image sensor according to the first embodiment of the present invention.
Figure 11:
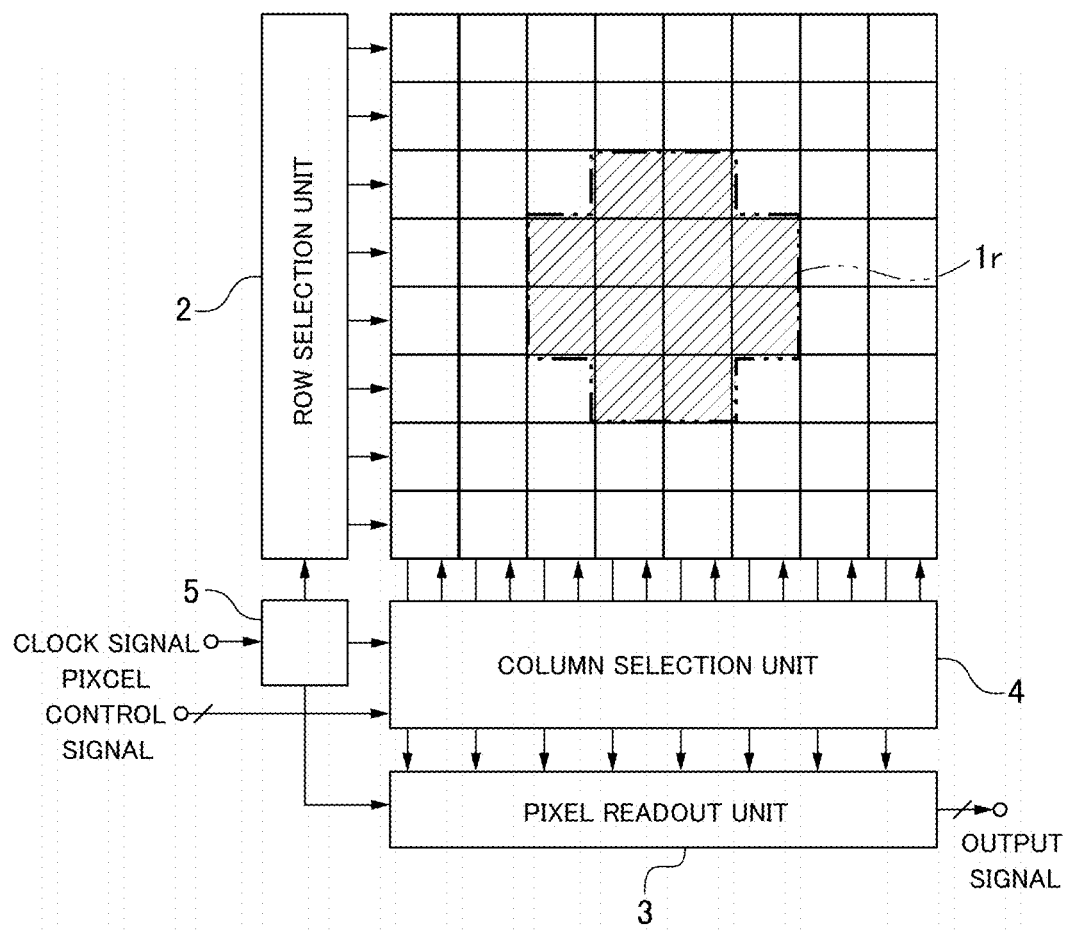
FIG. 11 is a diagram illustrating a reset region in the image sensor according to the first embodiment of the present invention.

FIG. 10 is a diagram illustrating a high-illuminance region and a low-illuminance region, and FIG. 11 is a diagram illustrating a reset region. When an exit is shot from inside a tunnel, for example, a central portion of a pixel region is a high-illuminance region 1h outside the tunnel, and a region around the high-illuminance region 1h is a low-illuminance region 1l inside the tunnel, as illustrated in FIG. 10. In such a case, when a corresponding pixel at the center is controlled as a pixel as a reset target (reset pixel) 1r, a more appropriate image signal can be obtained.

Figures 12A, 12B:
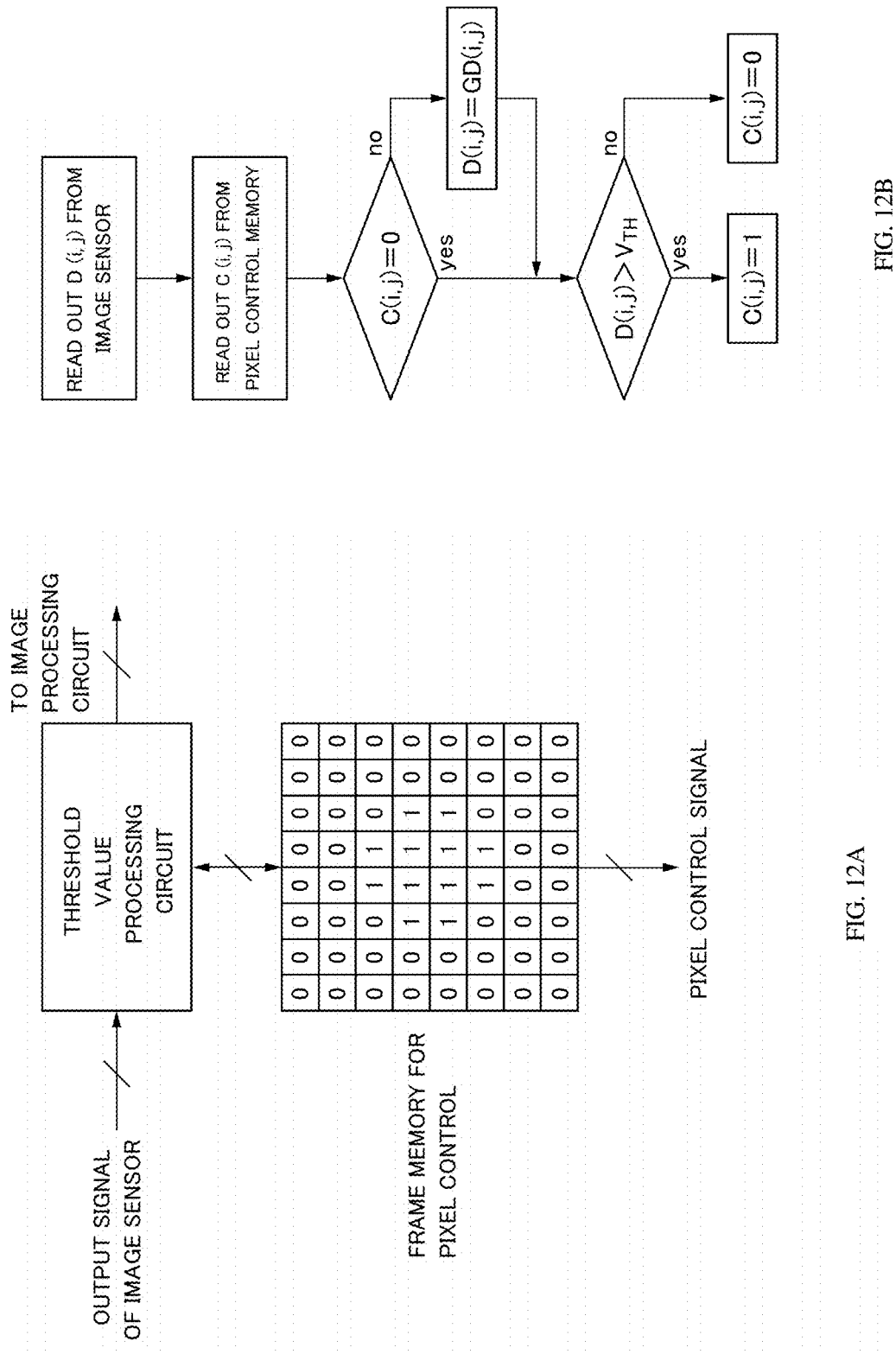
FIGS. 12A and 12B are diagrams each illustrating a method of forming a pixel control signal, where

FIGS. 12A and 12B are diagrams illustrating a method of forming a pixel control signal, where FIG. 12A is a block diagram of a logical circuit, and FIG. 12B is a flowchart. As illustrated in FIG. 12A, the image sensor outputs "1" representing a reset region and "0" representing a non-reset region, respectively, as output signals. As illustrated in FIG. 12B, an output signal D(i, j) is first read out of the image sensor as the pixel control signal. Then, a pixel control signal C(i, j) is read out of a frame memory for pixel control.

It is evaluated whether C(i, j) is "0" or "1". As a result of the evaluation, D(i,j) is kept as it is if C(i, j) is "0", and D(i, j) multiplexed by a set gain G is set to D(i, j) if C(i, j) is "1". Then, it is evaluated whether D(i, j) is more than or less than a threshold value $V_{TH}$. As a result of the evaluation, new C(i, j) is set to "1" if D(i, j) is more than the threshold value $V_{TH}$. New C(i, j) is set to "0" and is written into the frame memory for pixel control if D(i, j) is less than the threshold value $V_{TH}$. The new C(i, j) is outputted to an image processing circuit. The new C(i, j) becomes a pixel control signal, and is used for controlling an accumulated charge of each of the pixels in the image sensor.

Figure 13:
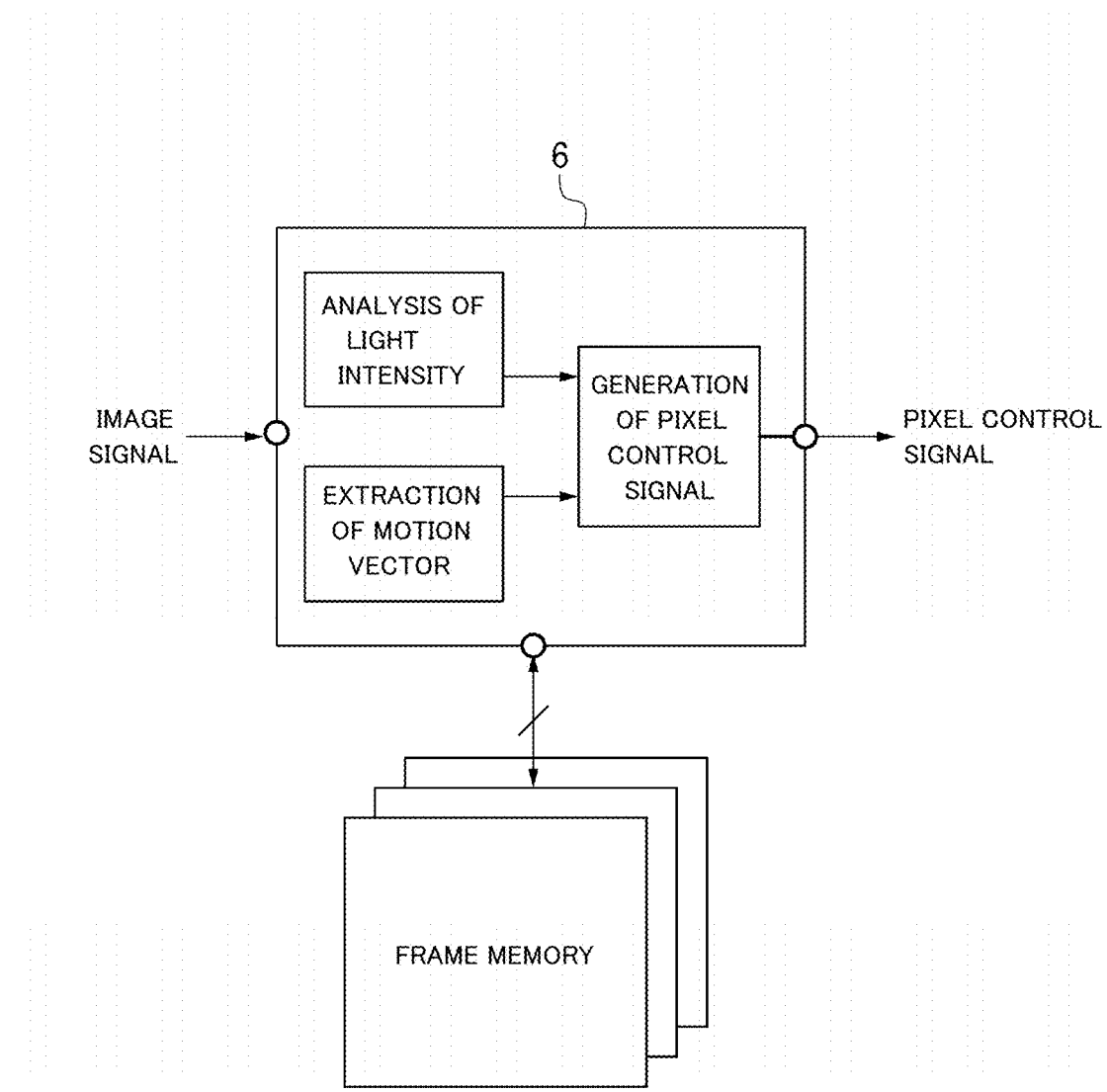
FIG. 13 is a block diagram illustrating a configuration of an image processing circuit in the image sensor according to the first embodiment of the present invention.

FIG. 13 is a diagram illustrating an operation of the image processing circuit. A control target region can be set using an image processing circuit 6 including frame memories as illustrated in FIG. 13. The image processing circuit 6 is provided outside the image sensor 10, for example, and receives an output signal from the image sensor 10 and produces a pixel control signal. The pixel control signal can be generated based on pixel information about an image or an image group preceding the current frame by one or more frames, for example. In the case, as the image or the image group, at least one type of luminance information, a motion vector, and value information (as to whether or not the image or the image group is worth reading out), for example, can be used. The pixel control signal generated by the image processing circuit 6 is outputted to the image sensor 10.

Figure 14:
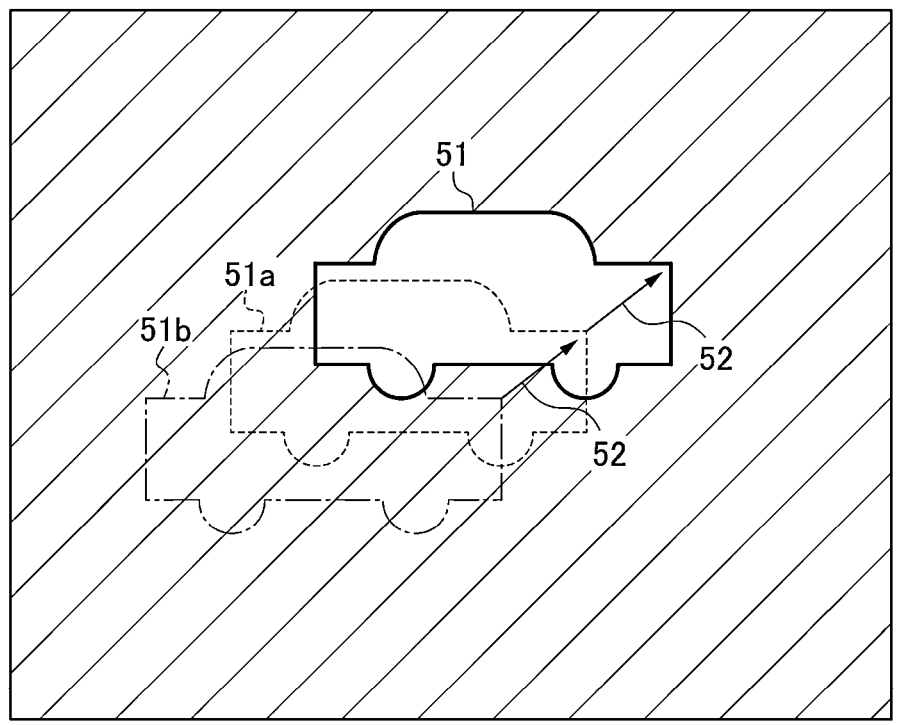
FIG. 14 is a diagram illustrating an example of control performed when a moving object is included in a picked-up image.
Figure 15:
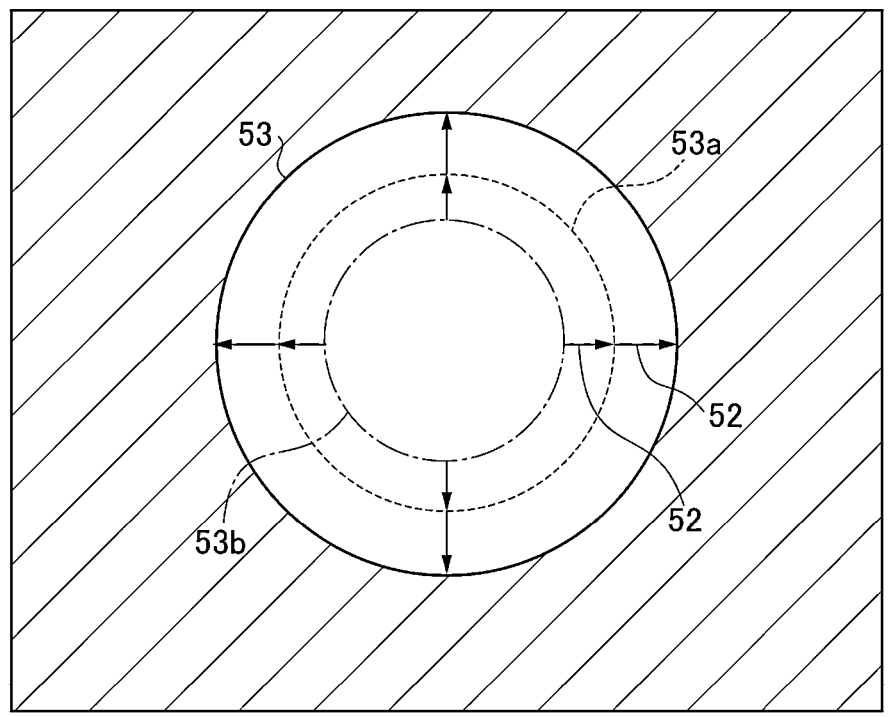
FIG. 15 is a diagram illustrating another example of control performed when a moving object is included in a picked-up image.

A case where prediction is required is also assumed in control of each of pixels. FIGS. 14 and 15 are diagrams each illustrating an example of control performed when a moving object is included in a picked-up image. As illustrated in FIG. 14, if an object to be controlled as a pixel as a reset target in a target frame 51 is moving, a motion vector 52 is extracted using a frame 51a preceding the target frame by one frame, a frame 51b preceding the target frame by two frames, and the like, and it is predicted whether the pixel in the target frame 51 is to be a high-illuminance pixel or a low-illuminance pixel using the motion vector 52. As a result, more accurate control can be performed.

FIG. 15 illustrates a state where a vehicle is traveling toward an exit of a tunnel, and a region not hatched of a central portion is a portion corresponding to the exit of the tunnel, and is a region to be a high-illuminance pixel. To control each of pixels in a target frame 53, a change with time in the region not hatched of the central portion is detected and is predicted, to enable more accurate control. Specifically, in a pixel control signal generation unit, a pixel control signal is determined based on an analysis result of light intensity obtained by using a target frame 53, a frame 53a preceding the target frame 53 by one frame, a frame 53b preceding the target frame 53 by two frames, and the like, and the motion vector 52.

Conventionally, detection of a motion vector in image processing has a problem that a calculation amount is increased, resulting in a reduced operation speed and increased power consumption, because a vector between coordinates a sum of squared differences of which is minimized is obtained by a search while the coordinates are shifted between frames. In the image sensor according to the present embodiment, a difference between preceding and succeeding frame memories each storing a control signal is used, to solve the problem.

Figures 16A, 16B, 16C, 16D, 16E:
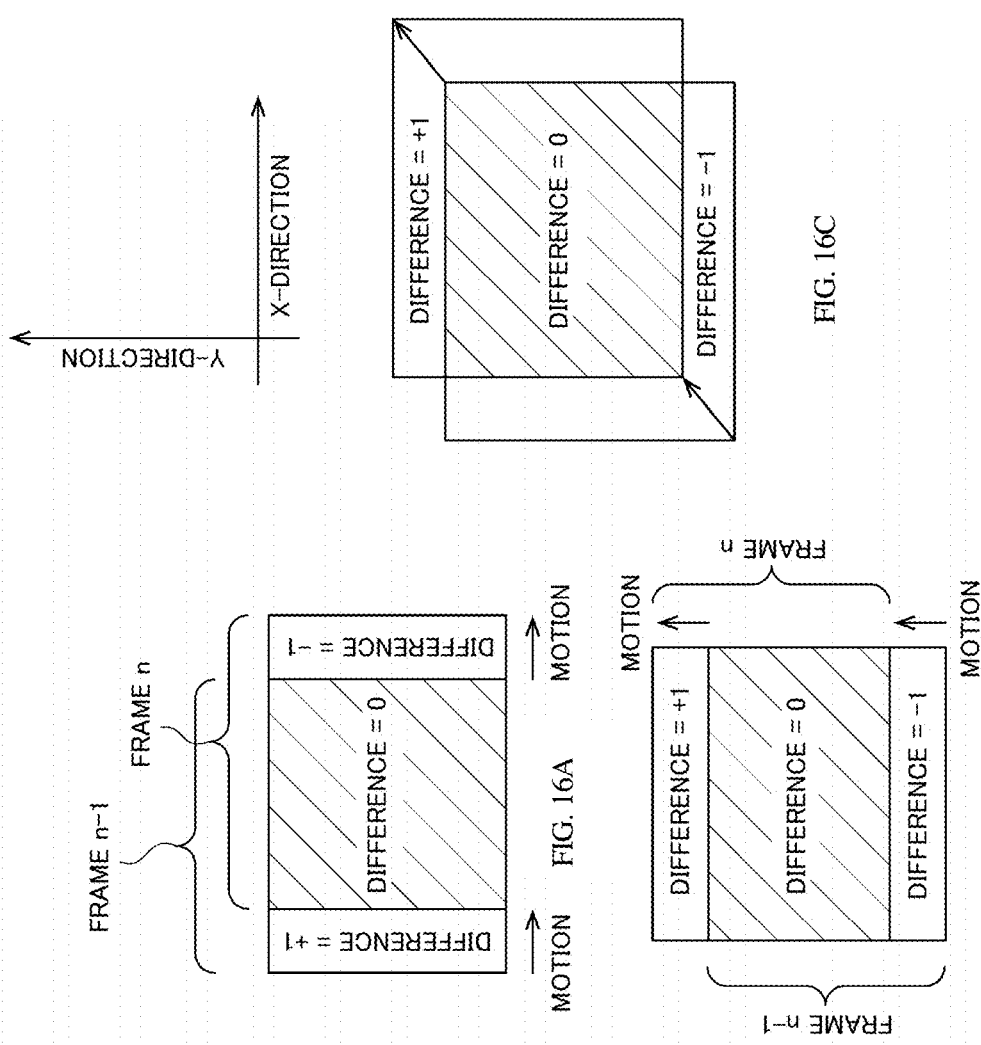
FIGS. 16A to 16E are conceptual diagrams each illustrating a method of detecting motion based on a difference in control information written into a memory.
Figure 17C:
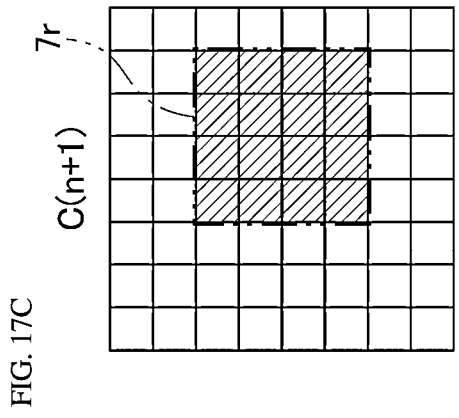
FIGS. 17A to 17D are conceptual diagrams each illustrating a method of forming motion-compensated pixel control data.
Figure 17B:
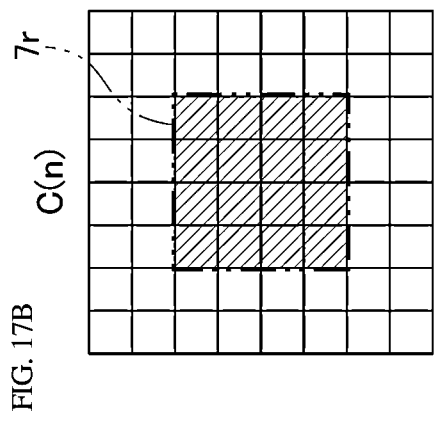
Figure 17D:
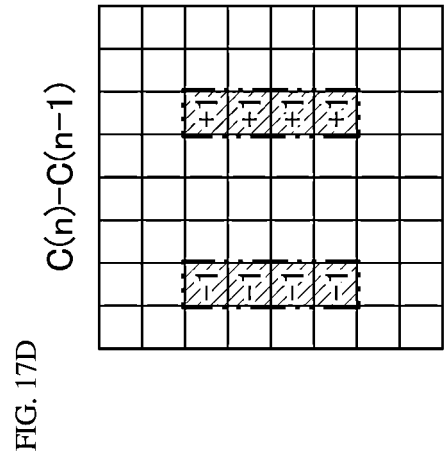
Figure 17A:
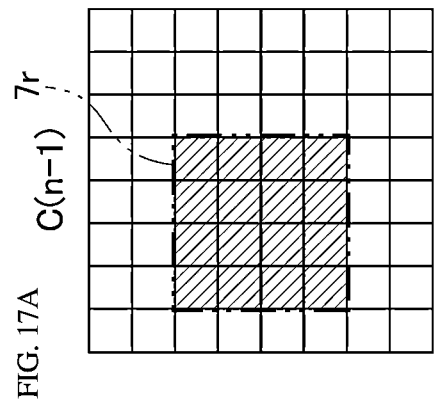

FIGS. 16A to 16E are conceptual diagrams each illustrating a method of detecting motion based on a difference between pixel control information written into a memory. FIG. 16A illustrates a difference between an (n−1)-th frame and an (n)-th frame when a reset region has moved in an X-direction. In the drawing, the difference is +1 on the right side, 0 at the center, and −1 on the left side. A value of motion is known based on a range of a shift in the X-direction of a region where the difference is +1 or −1.

FIG. 16B illustrates a difference between an (n−1)-th frame and an (n)-th frame when the reset region has moved in a Y-direction. In the drawing, the difference is +1 on the upper side, 0 at the center, and −1 on the left side. A value of motion is known based on a range of a shift in the Y-direction of a region where the difference is +1 or −1. FIG. 16C illustrates a difference between an (n−1)-th frame and an (n)-th frame when the reset region has moved in an oblique direction. In the drawing, the difference is +1 on the upper side and the right side, 0 at the center, and −1 on the lower side and the left side. A value of a motion vector is known based on a range of shifts in the X-direction and the Y-direction of a region where the difference is +1 or −1.

FIG. 16D illustrates a difference between an (n−1)-th frame and an (n)-th frame when the reset region has expanded. In this case, the difference is +1 in all left, right, upper, and left portions, i.e., peripheral portions in the drawing. A value of a motion vector when the reset region has expanded is known based on a range of shifts in the X-direction and the Y-direction where the difference is +1. FIG. 16E illustrates a difference between an (n−1)-th frame and an (n)-th frame when the reset region has contracted. In this case, a difference is −1 in all left, right, upper, and left portions, i.e., peripheral portions in the drawing. A value of a motion vector when the reset region has contracted is known based on a range of shifts in the X-direction and the Y-direction where the difference is −1.

As a result, the motion vector can be obtained based on the difference between the (n−1)-th frame and the (n)-th frame. In this method, the difference between the frames is taken, and the range of the shifts is only obtained. Thus, an operation amount is significantly small, and the motion vector in the reset region can be obtained at high speed and at low electric power.

When the motion vector obtained in the above-described method is used, the prediction accuracy of the reset region in the succeeding frame can be improved. FIGS. 17A to 17D are conceptual diagrams each illustrating a method of forming a motion-compensated pixel control signal. If the motion vector is used, a pixel control frame memory in an (n−1)-th frame preceding the current frame (n) by one frame is left. First, pixel control data in the current frame (n) is produced using the method illustrated in FIGS. 12A and 12B. At this time, difference data between data C(n) in a frame (n) and data C(n−1) in a frame (n−1) is obtained to produce data C(n)−C(n−1) in a difference frame, as illustrated in FIGS. 17A to 17D.

Then, motion-compensated pixel control data in the succeeding frame is produced using the data C(n)−C(n−1) in the difference frame for the data in the current frame (n). In this example, a reset region 7r is moving rightward. Thus, a reset region may be added to the right side only by an amount of motion of the difference frame from the data C(n) in the current frame, and a reset region on the left side may be deleted.

Figure 35:
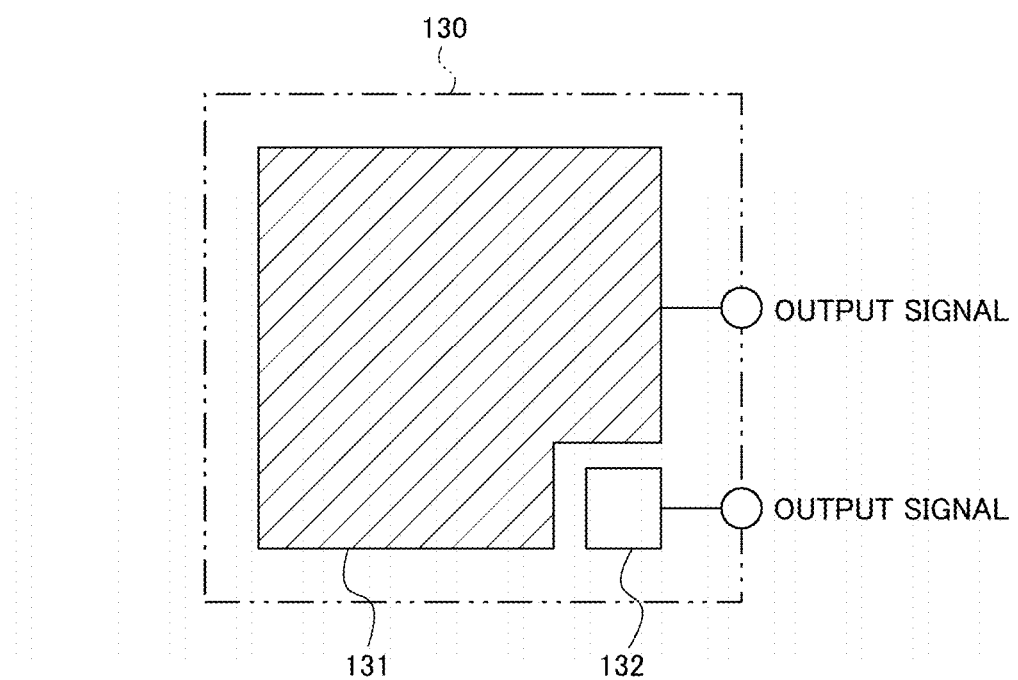
FIG. 35 is a diagram illustrating a pixel configuration for enlarging the dynamic range used in the conventional image sensor.
Figure 36:
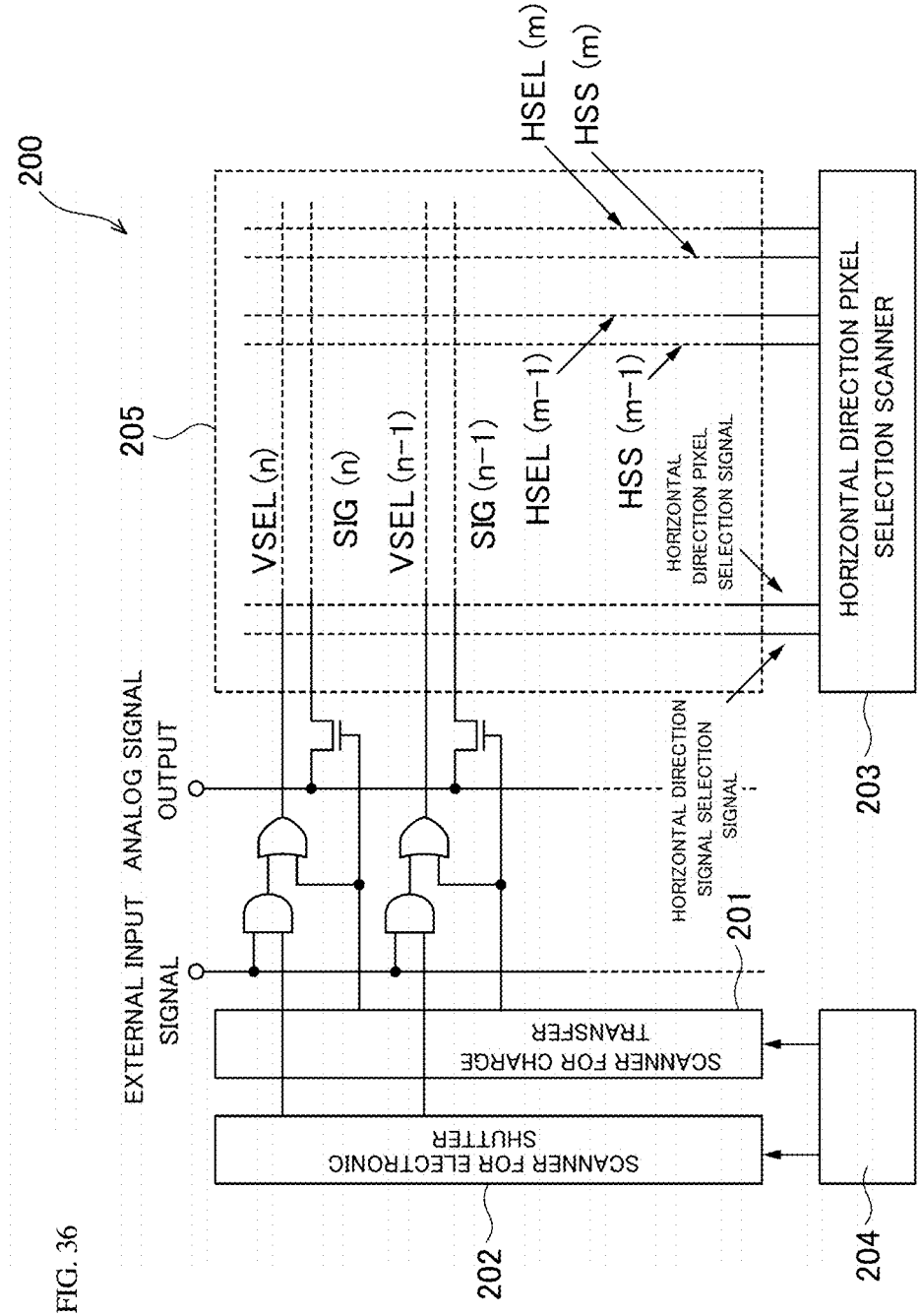
FIG. 36 is a diagram illustrating the outline of an image sensor described in Patent Literature 2.
Figure 37:
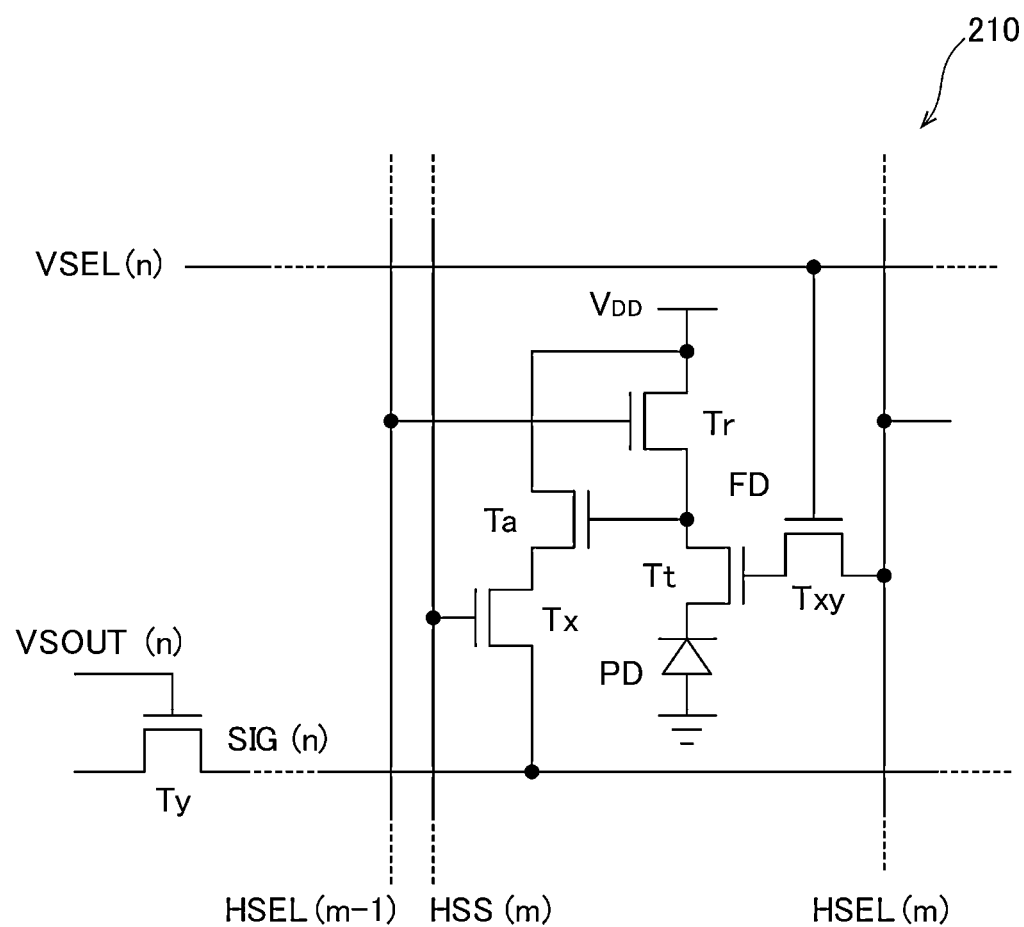
FIG. 37 is a diagram illustrating a unit pixel structure of the image sensor described in Patent Literature 2.

Note that although a method of controlling a charge accumulation amount to enlarge a dynamic range has been described in the present embodiment, the present invention is not limited to this. If a low-illuminance pixel and a high-illuminance pixel illustrated in FIG. 35 are used, either one of signal outputs may be selected in response to the pixel control signal.

As described in detail above, the image sensor according to the present embodiment can be set such that a charge accumulation time period of each of the pixels is long at a low illuminance and is short at a high illuminance. Accordingly, the dynamic range can be significantly enlarged without reducing a frame rate and reducing a resolution.

Note that the above-described configuration according to the present invention is usable for a higher dynamic range, a higher reliability, a higher speed, lower power consumption, lower noise, and a larger number of pixels of an image sensor, and is effective for not only an image sensor of visible light but also an infrared sensor, a terahertz sensor, a magnetic sensor, a pressure sensor, and the like.

(First Modification to First Embodiment)

Figure 18:
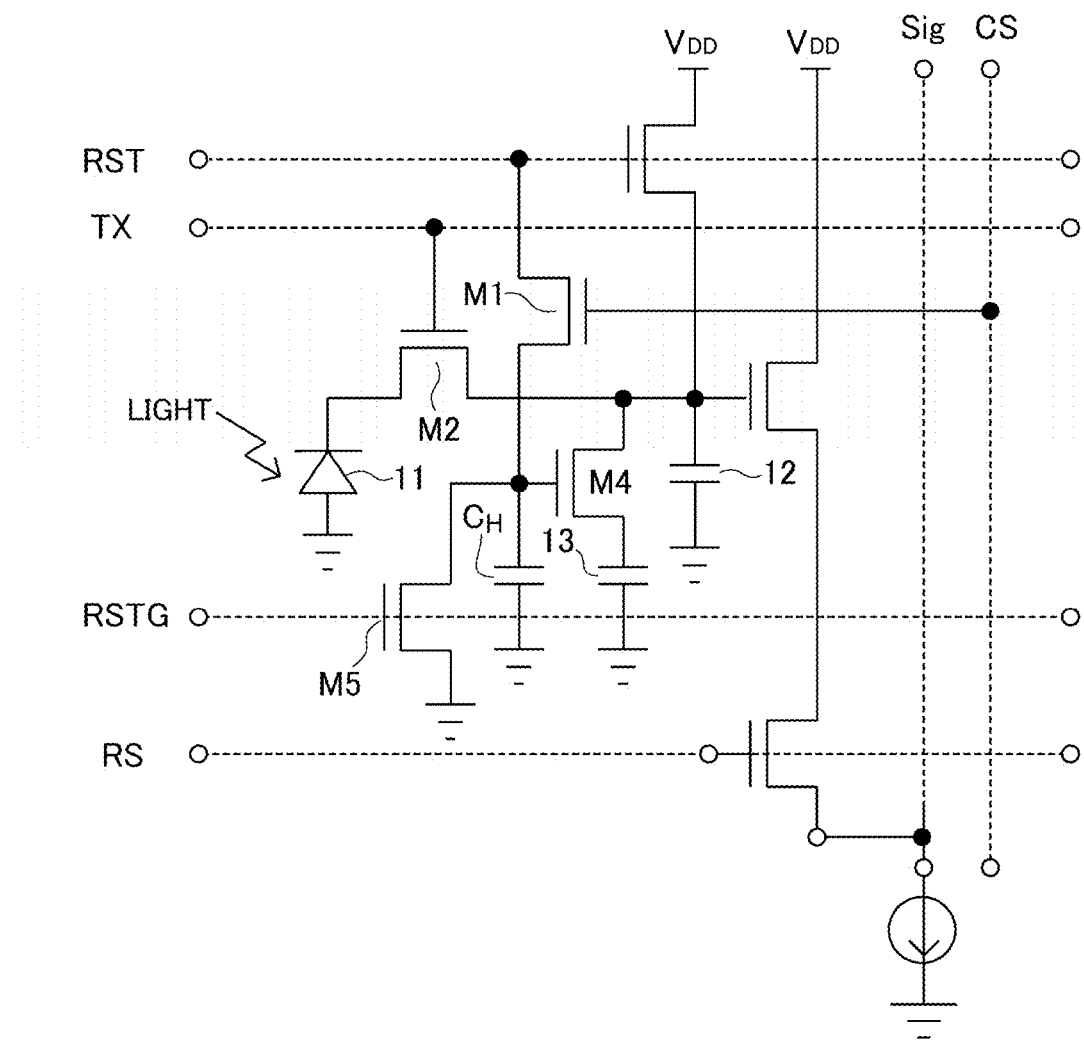
FIG. 18 is a circuit diagram illustrating a configuration example of a pixel in an image sensor according to a first modification to the first embodiment of the present invention.
Figure 19:
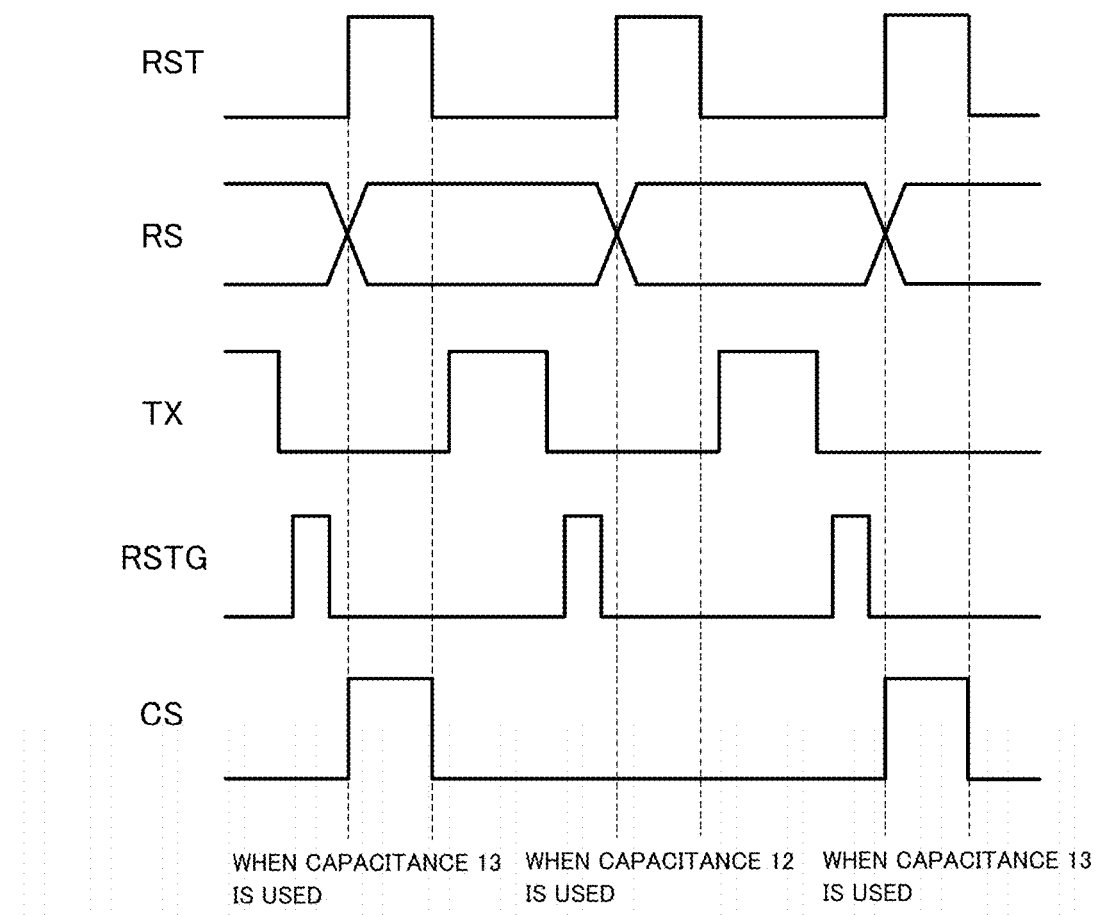
FIG. 19 is a diagram illustrating a method of controlling the pixel having a circuit configuration illustrated in FIG. 18.

Although a method of controlling a charge accumulation amount by changing a charge accumulation time period to enlarge a dynamic range has been described in the above-described first embodiment, the present invention is not limited to this, but the accumulated charge amount may be controlled by changing a charge accumulation capacity. FIG. 18 is a circuit diagram illustrating a configuration example of a pixel in an image sensor according to a first modification to the first embodiment of the present invention, and FIG. 19 is a diagram illustrating a method of controlling a pixel having a circuit configuration illustrated in FIG. 18.

As illustrated in FIG. 18, the pixel in the image sensor according to the present modification is configured such that in addition to a normal FD capacitance 12, a capacitance 13 having a large capacity that is several ten times that of the FD capacitance 12 is provided to prevent a voltage from being saturated at a high illuminance using the capacitance 13. In the pixel illustrated in FIG. 18, a transistor M1 is inserted between a reset signal RST and the gate of a MOS transistor M4 that selects the capacitance 13, and the gate of the transistor M1 is connected to a pixel control signal CS. A capacitance $C_H$ that holds a gate voltage for a predetermined period is connected to the gate of the transistor M4, and a held charge is discharged by a MOS transistor M5.

Then, a method of controlling the pixel having the circuit configuration illustrated in FIG. 18 will be described. Although the capacitance 12 or the capacitance 13 is selected at the time of resetting when the reset signal RST is "H", as illustrated in FIG. 19, in the image sensor according to the present modification, the capacitance 12 is selected at a low illuminance and the capacitance 13 is selected at a high illuminance, for example. That is, the pixel control signal CS selects "H" or "L" when the reset signal RST remains "H".

When the pixel control signal CS is made "L", the transistor M1 is turned off, and a gate voltage in a previous state of the MOS transistor M4 is held in a signal readout period during which a TX signal is "H". When readout ends, a charge discharge signal RSTG is made "H" to turn on the transistor M5, and the capacitance $C_H$ is discharged to turn off the MOS transistor M4. Then, the charge discharge signal RSTG is made "L", to prepare for a subsequent operation.

Even if a charge accumulation amount is controlled by changing a charge accumulation capacity, like in the image sensor according to the present modification, a dynamic range can be significantly enlarged without reducing a frame rate and reducing a resolution. Note that a configuration and an effect other than the foregoing in the present modification are similar to those in the above-described first embodiment.

(Second Modification to First Embodiment)

Figure 20:
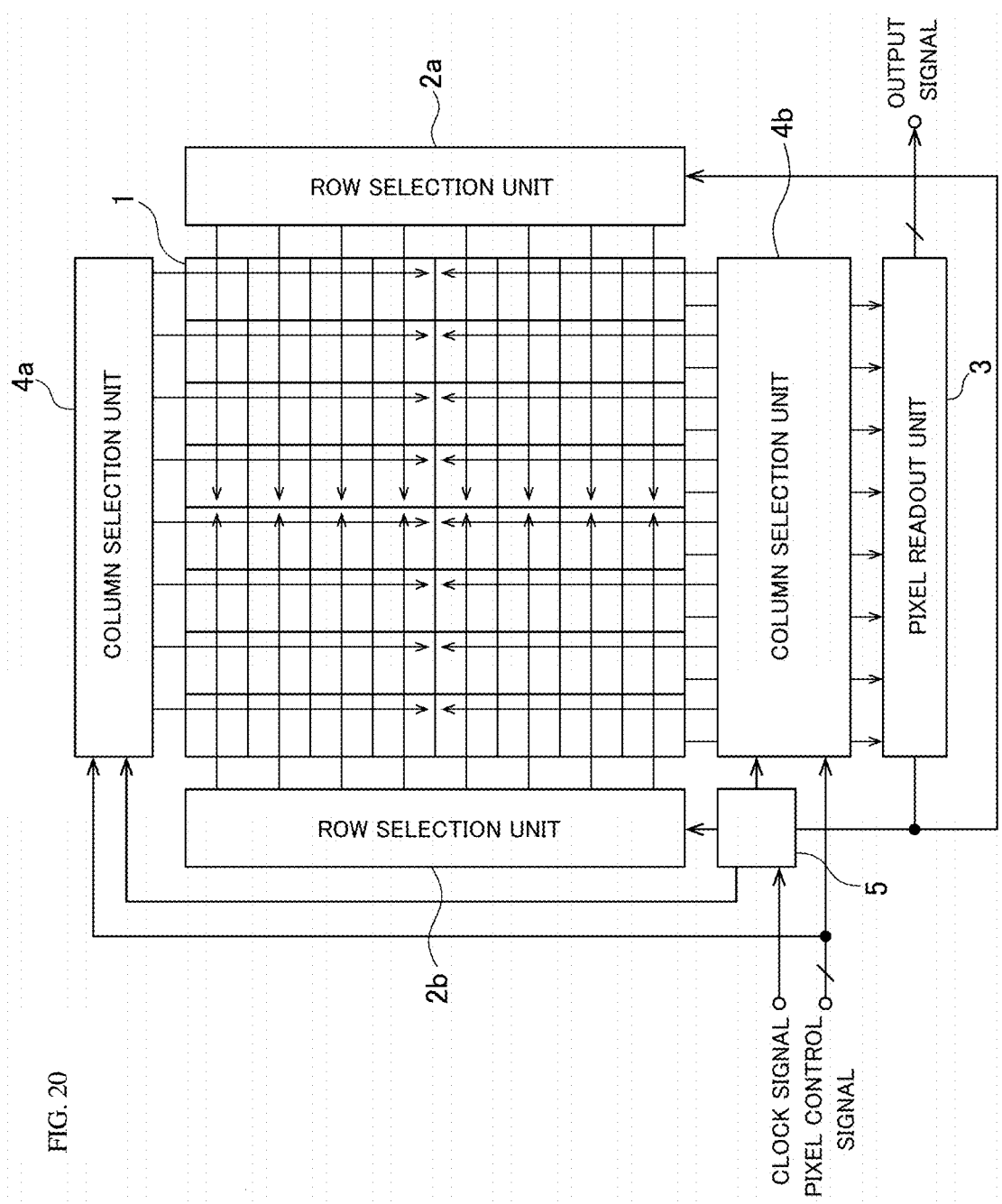
FIG. 20 is a block diagram illustrating a configuration of an image sensor according to a second modification to the first embodiment of the present invention.
Figure 21:
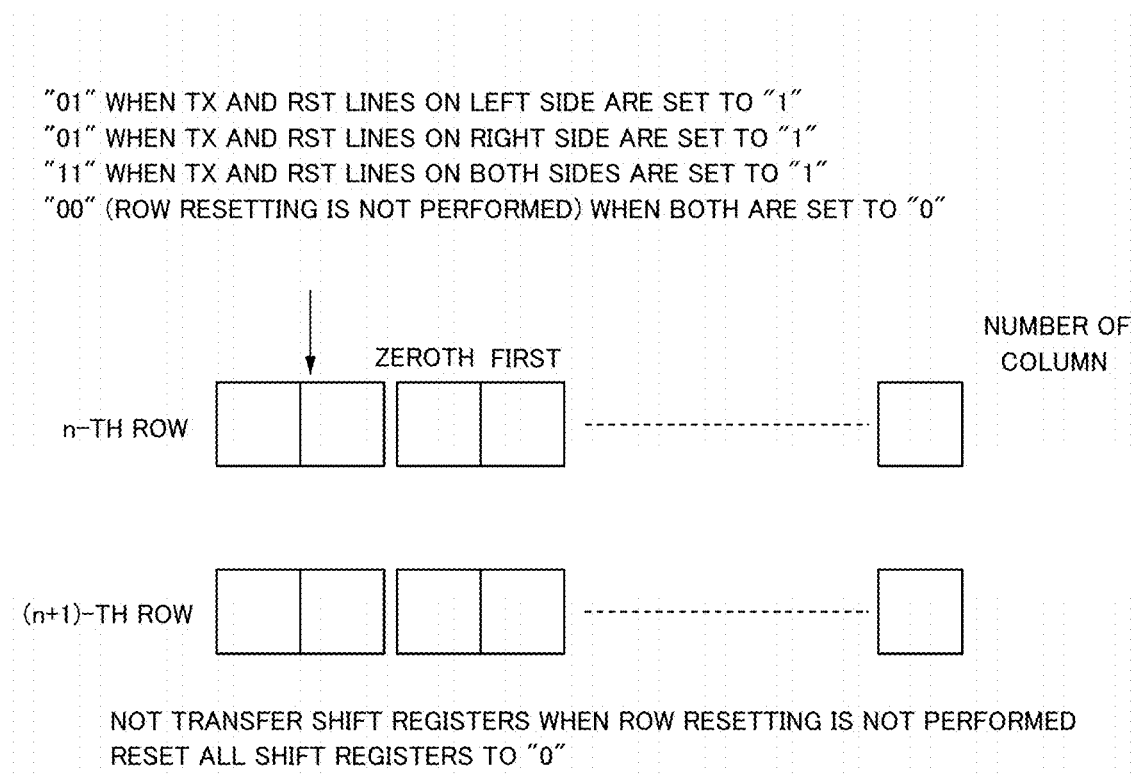
FIG. 21 is a diagram illustrating a method of controlling the image sensor illustrated in FIG. 20.

Then, an image sensor according to a second modification to the first embodiment of the present invention will be described. FIG. 20 is a block diagram illustrating a configuration of the image sensor according to the present modification, and FIG. 21 is a diagram illustrating a method of controlling the image sensor illustrated in FIG. 20. Since a control line that performs row selection and a control line that performs column selection each have a large capacity, an electric energy is consumed as a transition of a logic of the control lines occurs, resulting in increased power consumption.

In the image sensor according to the present modification, row selection units 2a and 2b are respectively arranged to the left and right of a pixel region, and each of the row selection lines is configured to be responsible for a portion on the right side or the left side in the drawing of the center of a pixel region, as illustrated in FIG. 20. On the other hand, column selection units 4a and 4b that perform column selection are respectively arranged above and below the pixel region, and each of the column selection lines is configured to be responsible for a portion on the upper side or the lower side in the drawing of the center of the pixel region. As a result, the pixel region to be controlled is divided into four portions. Accordingly, power consumption in the portions can be reduced to approximately one-fourth of that when such a configuration is not adopted.

To effectively use the above-described configuration, in the image sensor according to the present modification, a pixel control signal as serial data preferably has a control bit composed of approximately two bits prior to a control signal in a column, as illustrated in FIG. 21. As a result, the pixel control signal has a control code as to which of left and right columns is to be selected or whether all the columns are not selected. When receiving information about the control code, the image sensor generates a column selection signal corresponding to the information and stops data transfer using shift registers to reduce power consumption if all the columns are not selected. Note that a configuration and an effect other than the foregoing in the present modification are similar to those in the above-described first embodiment.

Second Embodiment

Figure 22:
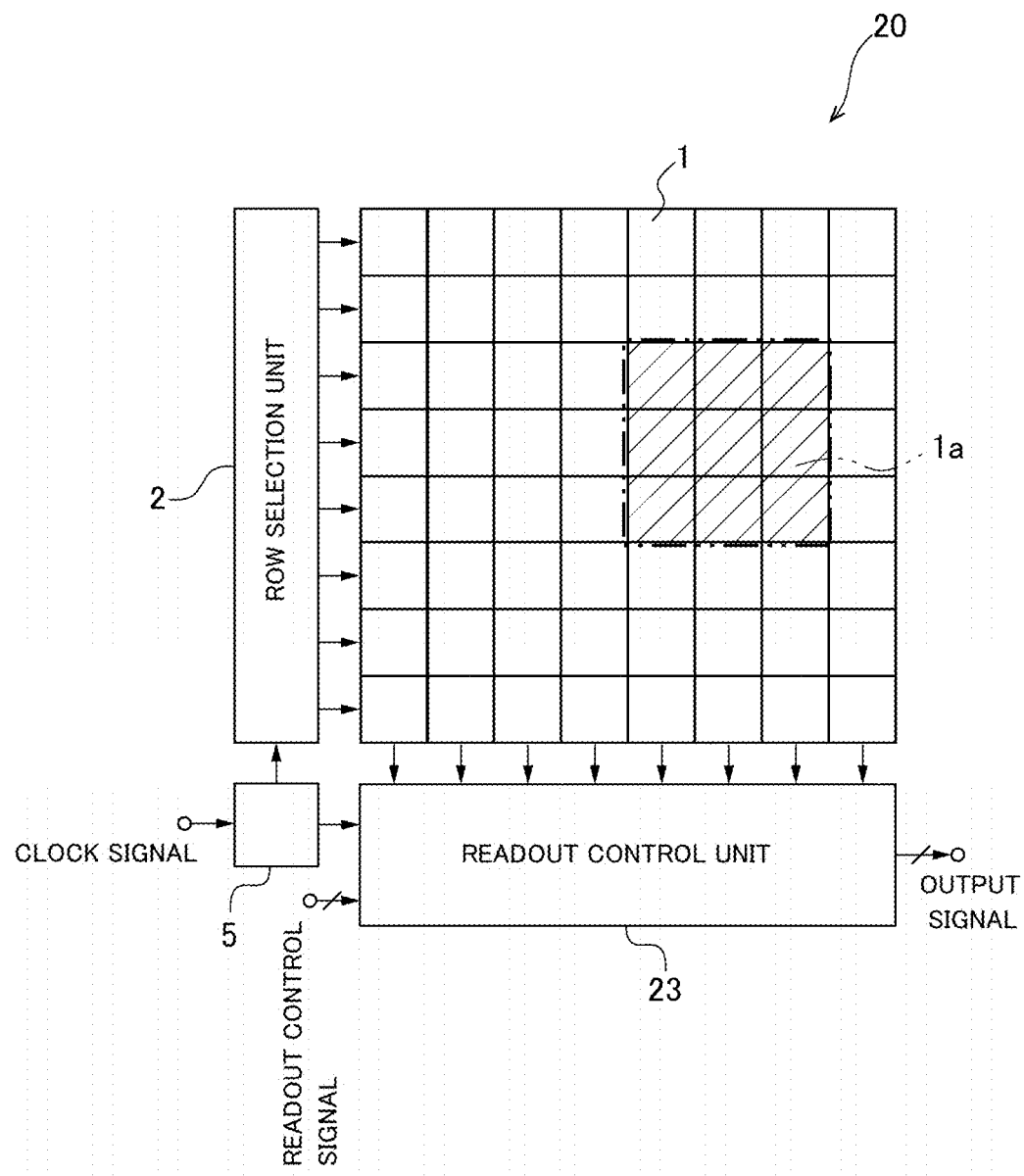
FIG. 22 is a diagram illustrating a signal readout region in an image sensor according to a second embodiment of the present invention.

Then, an image sensor according to a second embodiment of the present invention will be described. FIG. 22 is a block diagram illustrating a configuration of the image sensor according to the present embodiment. A conventional image sensor has been intended to faithfully reproduce a picked-up image, and has thus generated an image using signals for all pixels. On the other hand, in an image sensor that is intended to perform object recognition and moving object recognition, it is only necessary to capture only image information in a portion to be recognized in an image processing circuit, and image information in other portions need not be captured therein.

Extracting an analog image signal from each of the pixels, converting the analog image signal into a digital signal using an A/D converter, and transferring the digital signal to the image processing circuit involves predetermined power consumption. Accordingly, when object recognition and moving object recognition are performed using the conventional image sensor, much useless electric power is consumed. In recent years, when only a signal in a moving pixel region needs to be read out, there has been an increasing number of cases where only a signal in a pixel region requiring object recognition and moving object recognition needs to be read out.

An image quality of a very week signal in a dark scene significantly deteriorates when readout noise of the A/D converter is large. Accordingly, the A/D converter is required to have a high resolution N. However, power consumption of the A/D converter is proportional to 2 in circuit theory. Accordingly, performing analog-to-digital conversion with an unintentionally high resolution results in significantly increased power consumption. Therefore, the resolution of the A/D converter is required to be optimized depending on a state of a pixel signal.

In an image sensor 20 according to the present embodiment, a pixel readout circuit in each of columns is controlled for each of rows, to perform control to operate only the pixel readout circuit corresponding to a pixel (readout pixel) 1a read out and selected and reduce power consumption of the pixel readout circuit corresponding to a pixel not selected as much as possible. As a result, power consumption of the entire image sensor can be significantly reduced.

Figure 23:
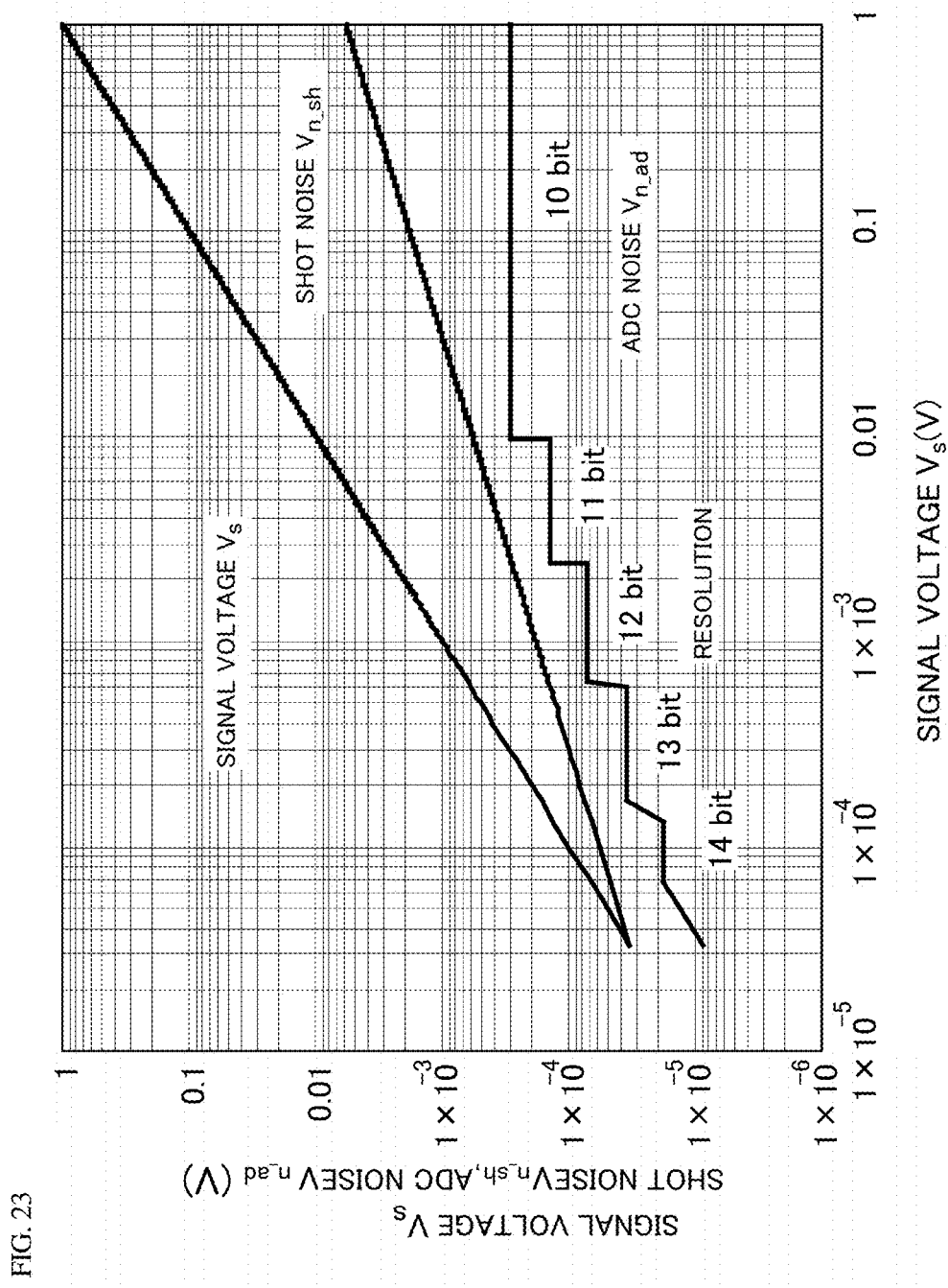
FIG. 23 is a diagram illustrating a relationship between a signal voltage and the resolution of an A/D converter.

It is also important to optimize the resolution of the A/D converter depending on a signal level of a pixel. FIG. 23 is a diagram illustrating a relationship between a signal voltage and the resolution of the A/D converter. FIG. 23 illustrates a signal level of a pixel in a CMOS image sensor, shot noise to be inevitably generated as conversion from a photon to an electron is performed, and a necessary resolution of an A/D converter in a readout circuit. As illustrated in FIG. 23, readout noise of the A/D converter becomes less noticeable if below the shot noise. Thus, to prevent an image quality from being deteriorated, the resolution of the A/D converter may be set such that the readout noise of the A/D converter is approximately half of the shot noise.

Figure 24:
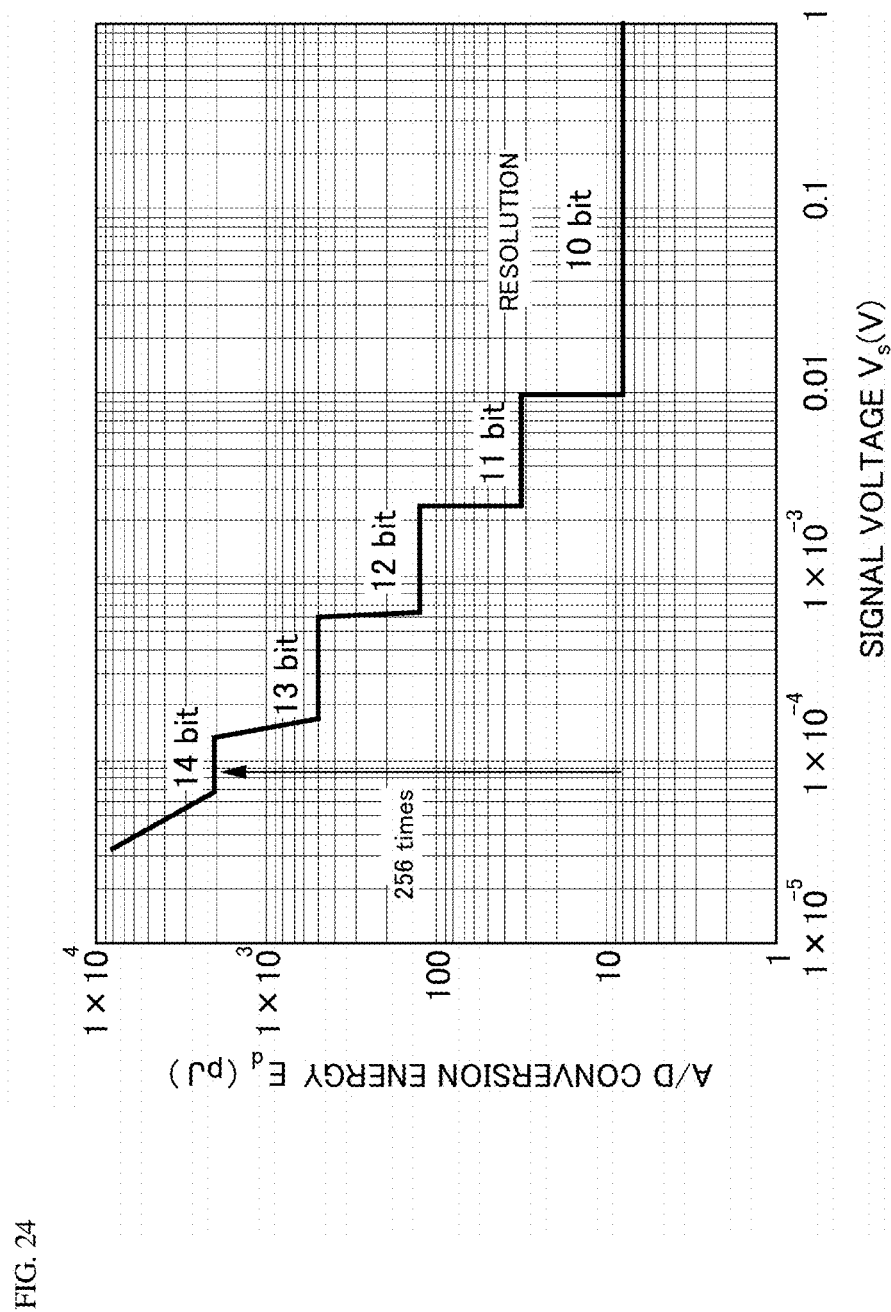
FIG. 24 is a diagram illustrating a relationship between a signal voltage and energy consumption of the A/D converter.

The A/D converter requires a resolution of approximately 10 bits in a place where a signal level is high, and requires a resolution of approximately 14 bits in a place where the signal level is low. To obtain a high image quality at any signal level, the resolution of approximately 14 bits seems to be preferably used. However, in the case, power consumption significantly increases. FIG. 24 is a diagram illustrating a relationship between a signal voltage and energy consumption of the A/D converter. As illustrated in FIG. 24, as the signal level decreases, the resolution of the A/D converter needs to be increased. However, it is known that the energy consumption of the A/D converter is proportional to $2^{2N}$, where N is the resolution of the A/D converter.

Therefore, when the resolution of the A/D converter is 14 bits, the A/D converter has energy consumption that is 256 times that when the resolution is 10 bits. This indicates that there is an optimum resolution to make an image quality and low power consumption compatible for each signal level of a pixel. On the other hand, in the image sensor according to the present embodiment, an image quality and power consumption can be controlled for each pixel and corresponding pixel readout circuit.

Figure 25:
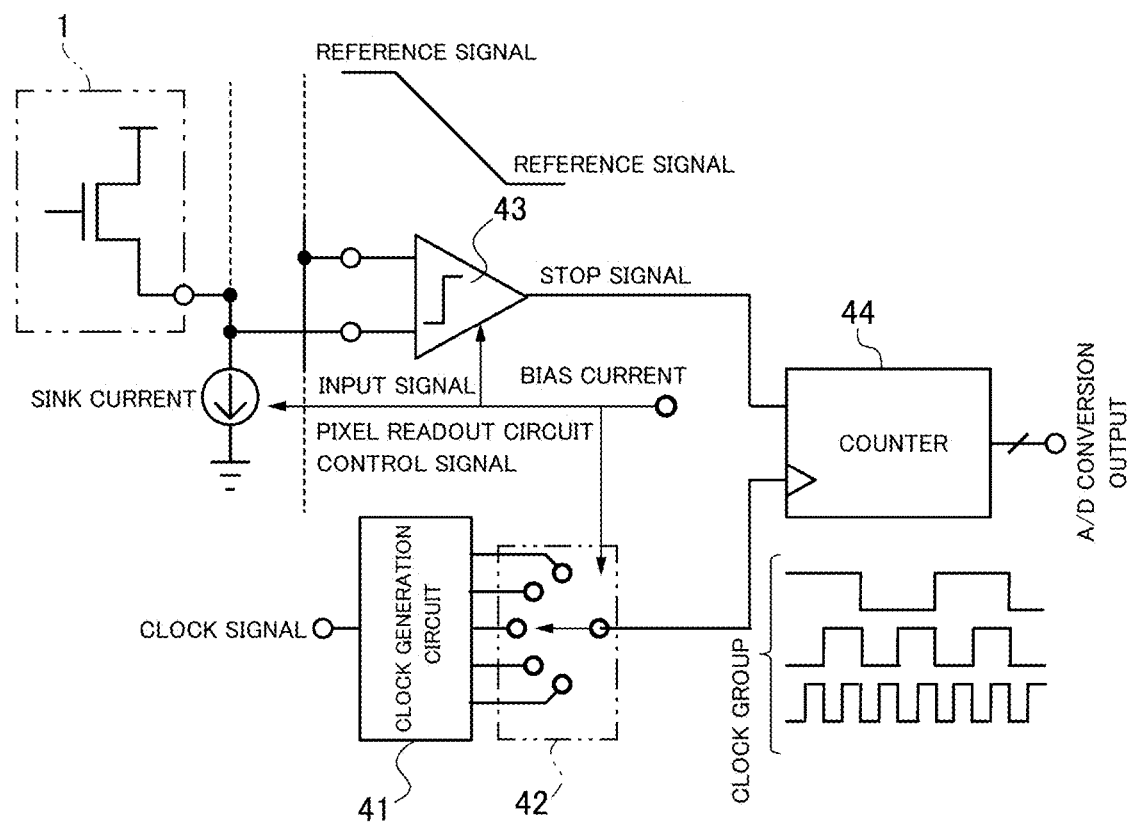
FIG. 25 is a circuit diagram illustrating a pixel and a configuration of a readout control unit in the image sensor according to the second embodiment of the present invention.

FIG. 25 is a circuit diagram illustrating a pixel and a pixel readout circuit in the image sensor 20 according to the present embodiment. As illustrated in FIG. 25, in the image sensor 20 according to the present embodiment, a source follower transistor is provided in a pixel 1, and a signal can be read out by making a current flow in the source follower transistor by a sink current provided for each readout circuit. Such a readout voltage is inputted to one of inputs of a comparator 43, and a reference voltage, which linearly changes with time, is inputted to the other input of the comparator 43.

In a clock generation circuit 41, a clock pulse having a frequency that is an integral multiple or an integral fraction of a frequency of an input clock signal is generated, and is inputted to a counter 44. The counter 44 counts a clock. When an input signal and a reference signal match each other, for example, a stop signal is generated from the comparator 43, to stop the counter 44, and a count value at that time is outputted as an A/D conversion output value corresponding to a signal output voltage from the pixel.

In the above-described circuit, if only the readout circuit corresponding to the pixel (readout pixel) 1a read out and selected, illustrated in FIG. 22, is operated, and an operation of the readout circuit corresponding to the pixel not read out and selected is stopped, electric power can be expected to be significantly reduced. In the pixel readout circuit illustrated in FIG. 25, for example, if the sink current for operating a source follower and a bias current of the comparator 43 are interrupted, and the clock to be inputted to the counter 44 is stopped, power consumption of the pixel readout circuit becomes approximately zero.

Figure 26:
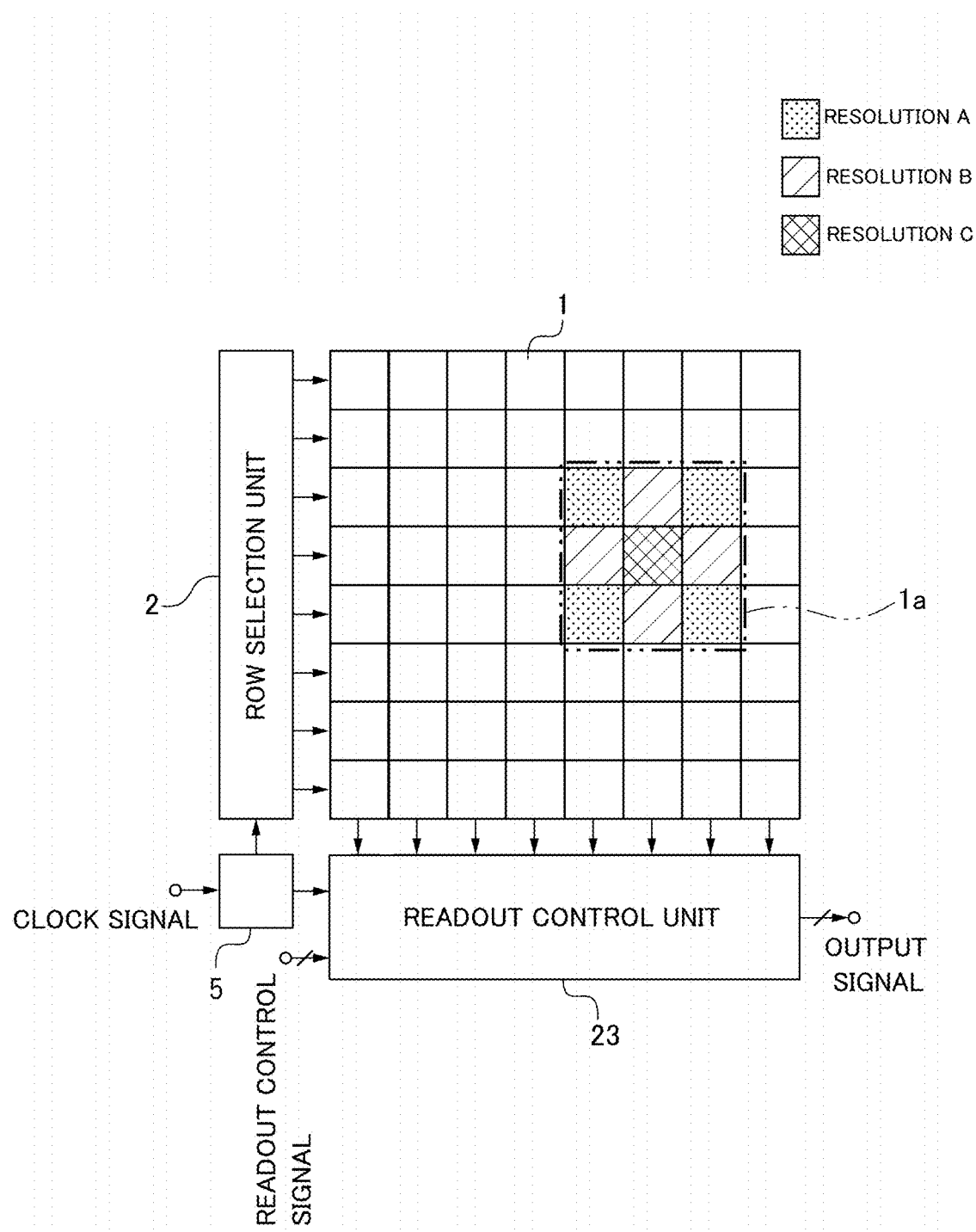
FIG. 26 is a diagram illustrating selected pixels and their respective resolutions.

Changing the resolution of the A/D converter included in the readout circuit depending on the signal strength of the pixel is effective to optimize an image quality and power consumption. FIG. 26 is a diagram illustrating selected pixels and their respective resolutions. As the resolution of each of the selected pixels illustrated in FIG. 26, a resolution A is 10 bits, a resolution B is 12 bits, and a resolution C is 14 bits. A clock to be inputted to the counter 44 illustrated in FIG. 25 depending on the resolutions may be selected by a clock selection circuit 42 from a clock group including various frequencies.

The clock having a low frequency is selected when the resolution is low, and the clock having a high frequency is selected when the resolution is high. The clocks respectively having the frequencies in a ratio of 1:4:16 are selected depending on the resolutions A, B, and C. Power consumption of the counter 44 is proportional to a clock frequency. Thus, the lower the resolution is, the more the power consumption can be reduced. Note that the higher the resolution is, the lower a signal-to-noise ratio is. Thus, the signal-to-noise ratio needs to be optimized in consideration of both a request for an image quality and a request for power consumption.

Figure 27:
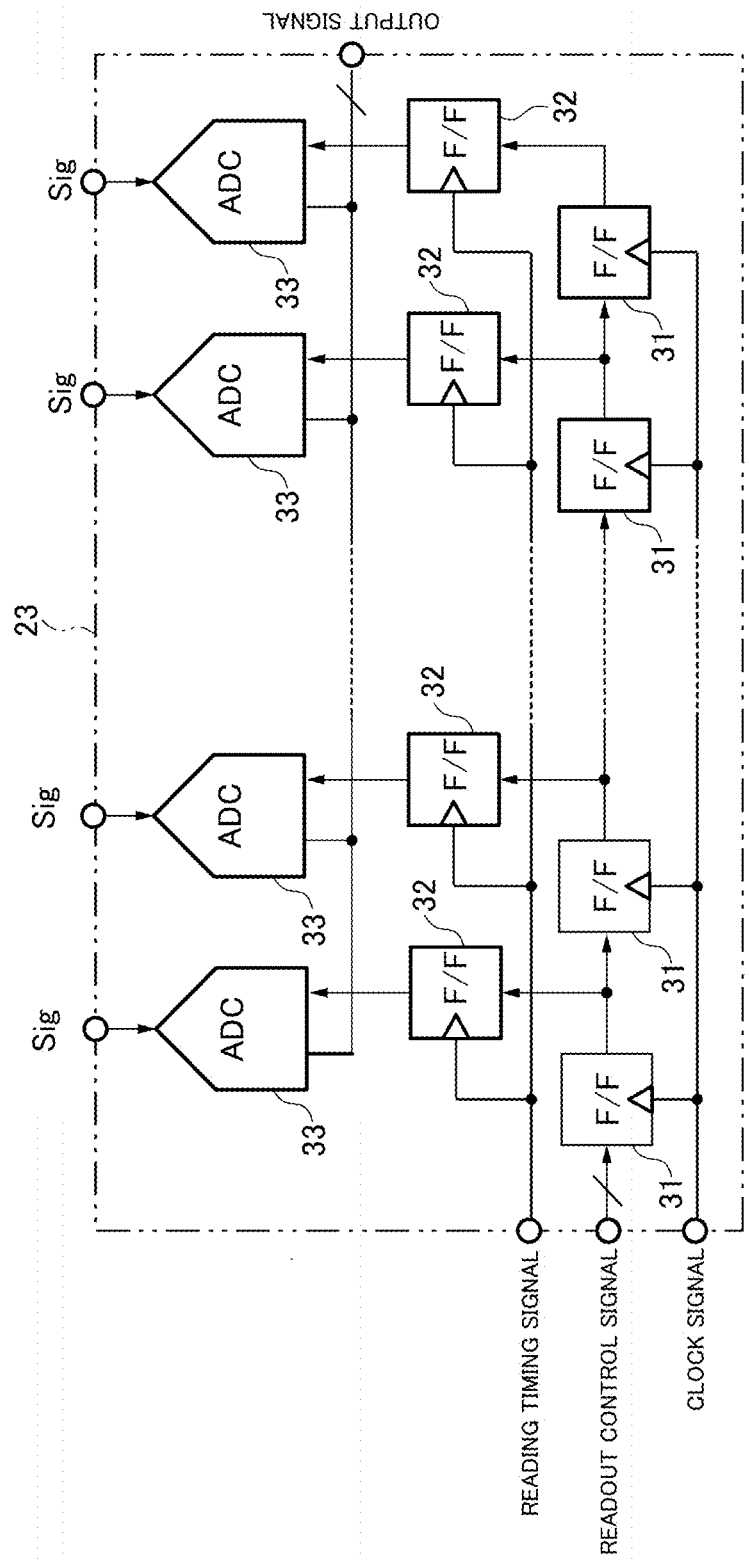
FIG. 27 is a circuit diagram illustrating a configuration of a readout control unit 23 in an image sensor according to the second embodiment of the present invention.

FIG. 27 is a circuit diagram illustrating a configuration of a readout control unit 23 in the image sensor 20 according to the present embodiment. A readout control signal is inputted to flip-flops (F/F) 31 respectively forming shift registers that are synchronized with a clock signal, and is sequentially transferred rightward, and is simultaneously inputted to flip-flops 32 in synchronization with a reading timing signal, to control A/D conversion circuits 33 respectively forming readout circuits.

Figure 28:
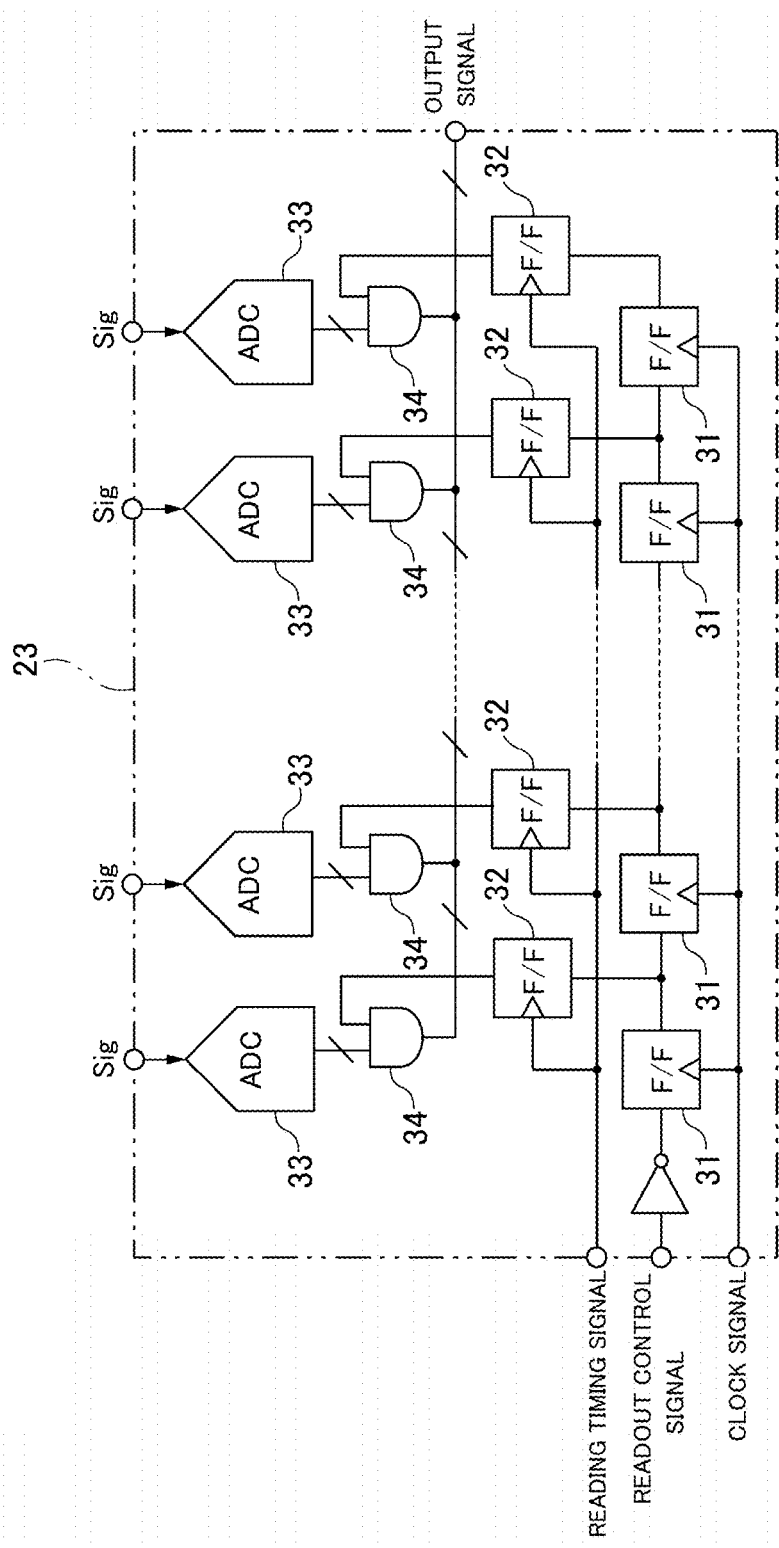
FIG. 28 is a circuit diagram illustrating another configuration of the readout control unit 23 in the image sensor 20 according to the second embodiment of the present invention.
Figure 29:
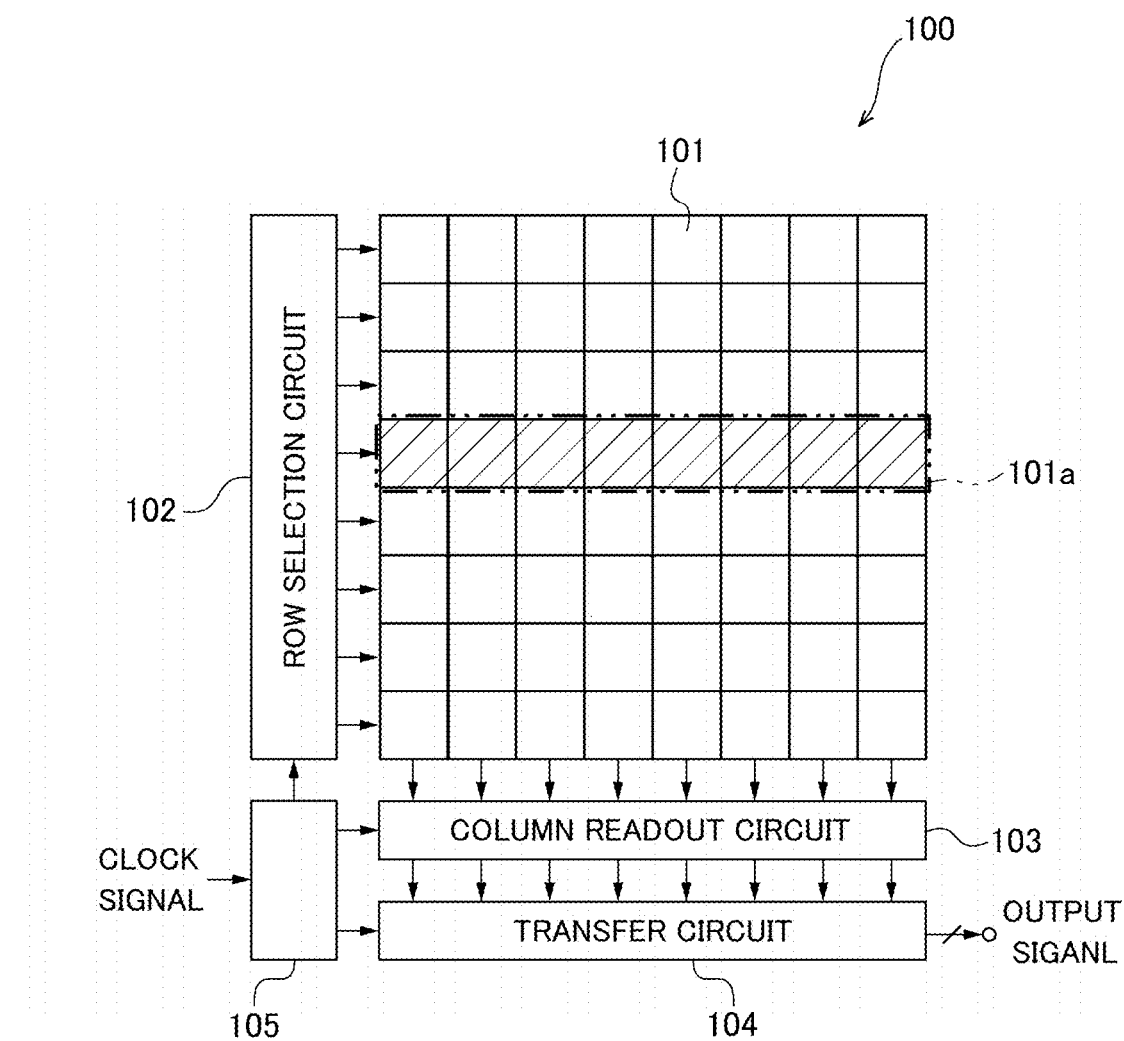
FIG. 29 is a block diagram illustrating a configuration of a conventional CMOS image sensor.
Figure 30:
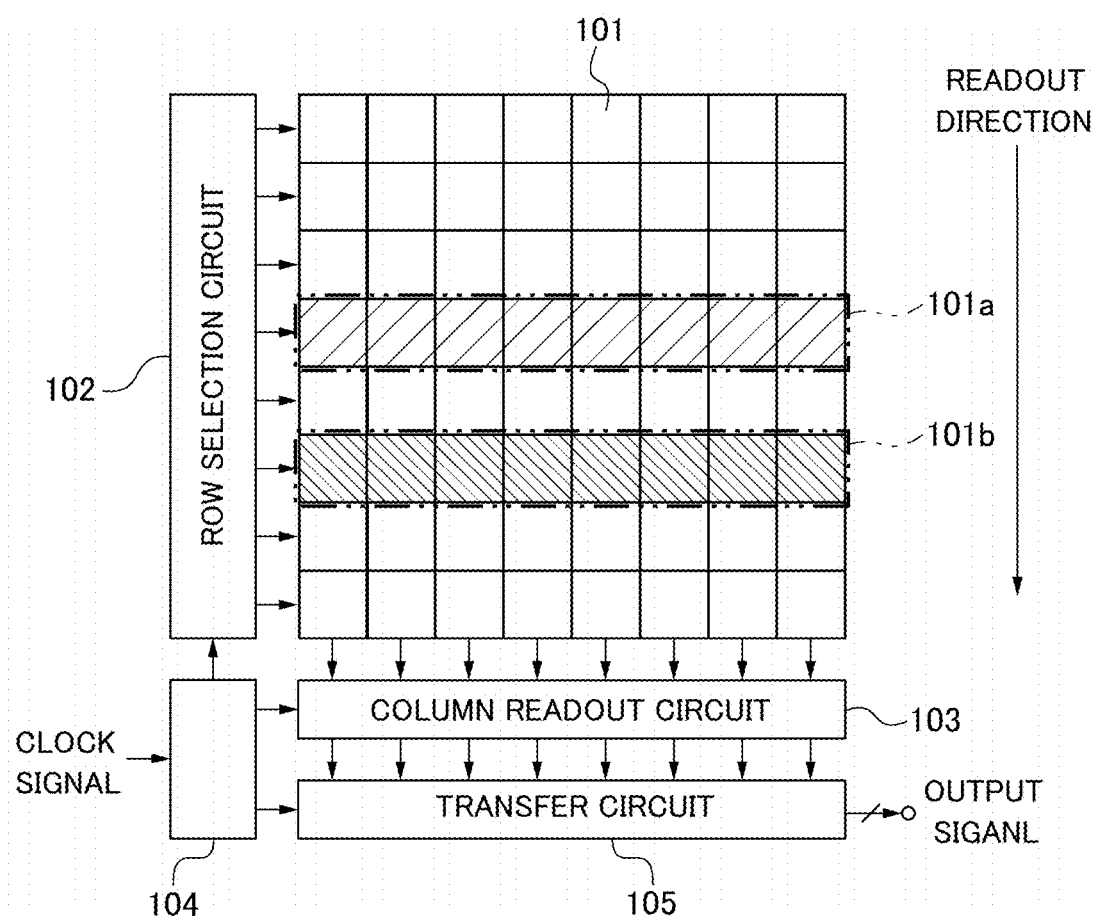
FIG. 30 is a diagram illustrating a method of controlling a charge accumulation time period in the conventional CMOS image sensor 100.
Figure 31:
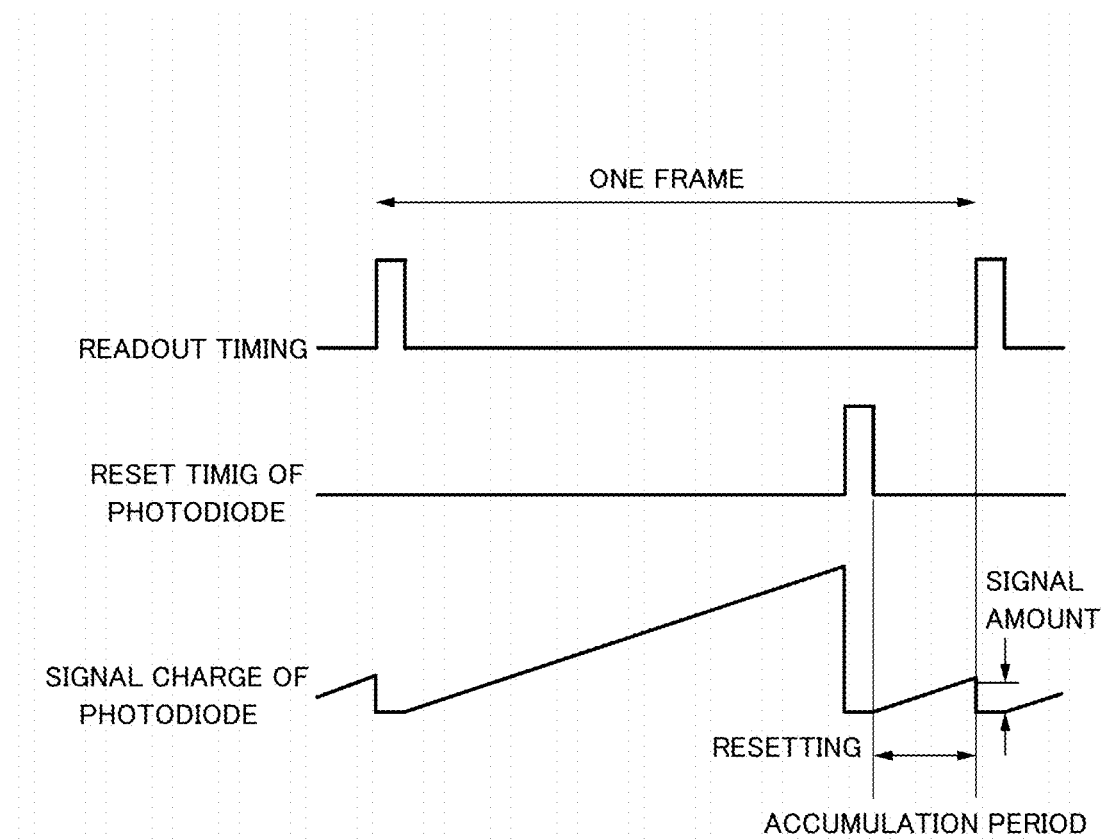
FIG. 31 is a diagram illustrating a readout timing and a reset timing of the conventional CMOS image sensor 100.
Figure 32A:
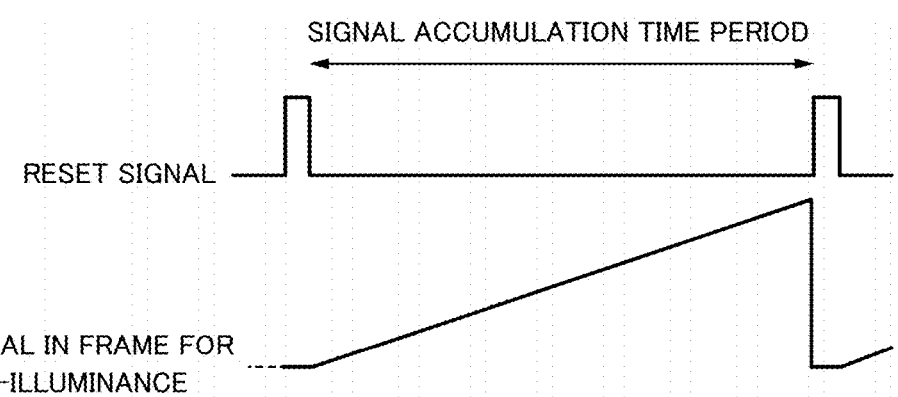
FIGS. 32A and 32B are diagrams illustrating signals acquired in a method described in Patent Literature 1, where
Figure 32B:
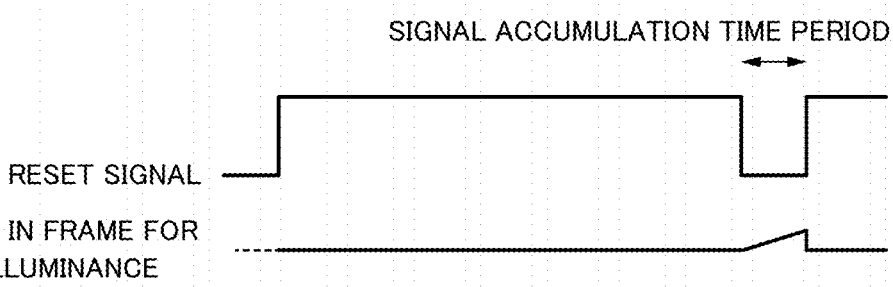
Figure 33:
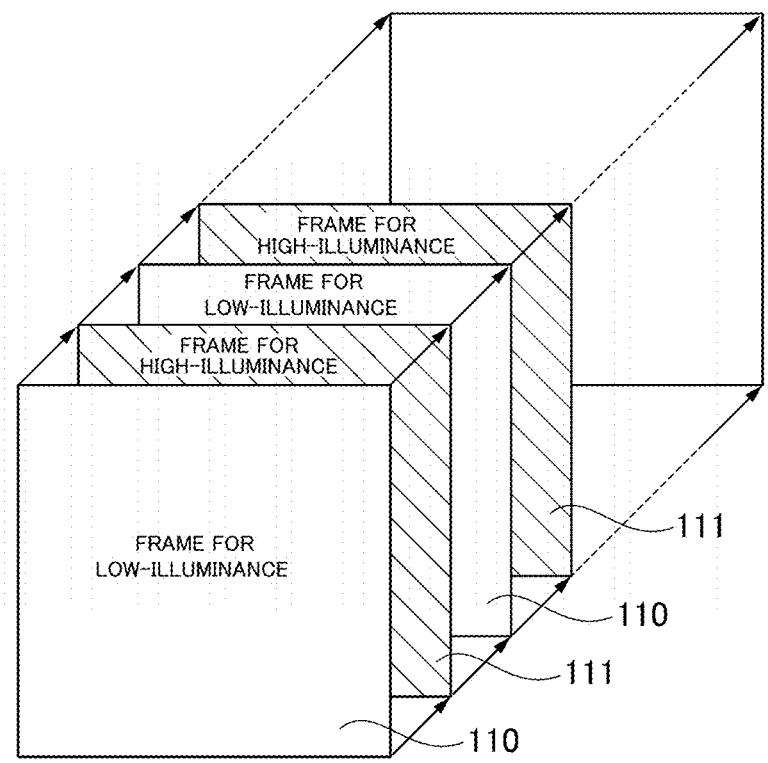
FIG. 33 is a diagram illustrating respective configurations of a frame for low illuminance and a frame for high illuminance
Figure 34:
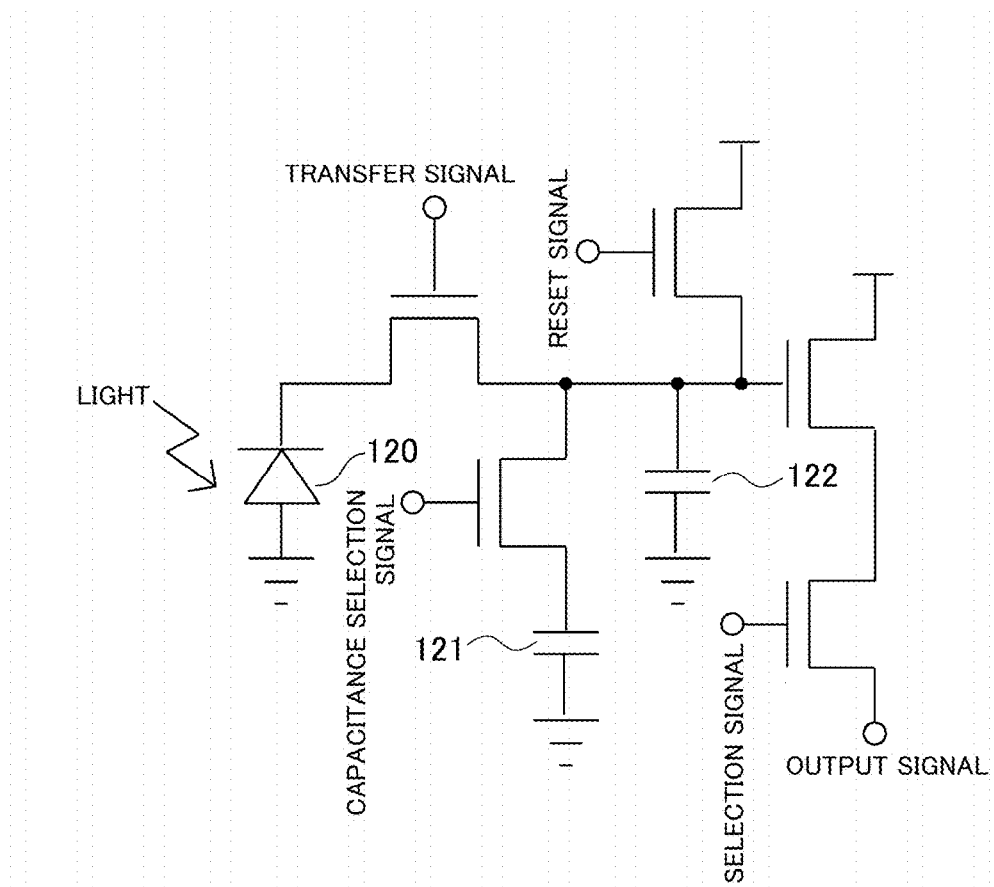
FIG. 34 is a circuit diagram for enlarging a dynamic range used in a conventional image sensor.

Further, the image sensor 20 according to the present embodiment can reduce power consumption occurring due to data transfer from the A/D converter by controlling the data transfer. FIG. 28 is another circuit diagram illustrating a configuration of the readout control unit 23 in the image sensor 20 according to the present embodiment. In the image sensor 20 in which the readout control unit 23 has the configuration illustrated in FIG. 28, a readout control signal is inputted to flip-flops (F/F) 31 respectively forming shift registers that are synchronized with a clock signal, is sequentially transferred rightward in the drawing, and is simultaneously inputted to flip-flops 32 in synchronization with a reading timing signal. In the image sensor 20, gate circuits 34 are controlled, to respectively control data transfers from A/D conversion circuits 33.

As described in detail above, the image sensor according to the present embodiment controls for each of the rows the pixel readout circuit in each of the columns and performs control to operate only the pixel readout circuit corresponding to the pixel (readout pixel) read out and selected and reduce the power consumption of the pixel readout circuit corresponding to the pixel not selected as much as possible, to enable the power consumption of the entire image sensor to be significantly reduced. Further, the image sensor according to the present embodiment can optimize the image quality and the power consumption because the resolution of the A/D converter included in the readout circuit is changed depending on the signal strength of the pixel. Further, the image sensor according to the present embodiment can reduce the power consumption occurring due to data transfer from the A/D converter by controlling the data transfer.

Note that a configuration and an effect other than the foregoing in the present embodiment are similar to those in the above-described first embodiment. Although the CMOS image sensor is taken as an example in the foregoing description, the present invention is not limited to this, but can also be applied to a two-dimensional image sensor as another application. Further, the image sensor includes an infrared sensor, a terahertz sensor, a magnetic sensor, and a pressure sensor.

The invention claimed is:

1. An image sensor comprising:
a pixel region where a plurality of pixels each including a sensor element that detects a naturally occurring physical quantity and converts the physical quantity into an electric signal are arranged in two dimensions in a row direction and a column direction;
a row selection unit that selects any of the pixels in the pixel region in units of rows and contributes to readout of the electric signal from each of the pixels and resetting of an accumulated charge;
a pixel readout unit that reads out the electric signal from each of the pixels selected by the row selection unit in column-parallel; and
a column selection unit that selects the pixel in any column from a pixel row selected by the row selection unit and controls a charge accumulation amount of the selected pixel, wherein
the column selection unit is provided with shift registers, a pixel control signal inputted to the column selection unit is transferred in the row direction by the shift registers, and column selection signals are simultaneously outputted, respectively, from the shift registers in response to a reading timing signal inputted to the column selection unit.

2. The image sensor according to claim 1, wherein the column selection unit resets the accumulated charge for the pixel not selected.

3. The image sensor according to claim 2, wherein the pixel includes a MOS transistor having its source connected to a row selection line connected to the row selection unit and used to reset the accumulated charge, having its gate connected to a column selection line connected to the column selection unit, and having its drain connected to the gate of a transfer transistor that transfers an accumulated charge of a photodiode to a capacitance, and the MOS transistor controls the resetting of the accumulated charge.

4. The image sensor according to claim 1, wherein the column selection unit transfers the accumulated charge of the pixel not selected to a capacitance.

5. The image sensor according to claim 4, wherein the pixel includes a MOS transistor having its source connected to a row selection line connected to the row selection unit and used to transfer the accumulated charge, having its gate connected to a column selection line connected to the column selection unit, and having its drain connected to the gate of a transfer transistor that transfers an accumulated charge of a photodiode to a capacitance, and the MOS transistor controls the transfer of the accumulated charge.

6. The image sensor according to claim 1, wherein the column selection unit changes a charge accumulation capacity of the selected pixel to control a charge accumulation amount.

7. The image sensor according to claim 1, wherein
a first row selection unit and a second row selection unit and a first column selection unit and a second column selection unit are respectively provided on the side in a row direction and on the side in a column direction with the pixel region sandwiched therebetween,
each of the first row selection unit and the second row selection unit selects the pixels from an end on the side closer to the row selection unit to a center in the row direction among the pixels in the pixel region, and
each of the first column selection unit and the second column selection unit selects the pixels from an end on the side closer to the column selection unit to a center in the column direction among the pixels in the pixel region.

8. The image sensor according to claim 1, wherein the column selection it stops transferring the signal by the shift registers, when the pixel control signal having a control code indicating that all the columns are not selected is inputted.

9. The image sensor according to claim 1, further comprising
a pixel control signal generation unit that generates the pixel control signal,
wherein the pixel control signal generation unit generates the pixel control signal by determining whether a previous output signal has a value that is a threshold value or more or is less than the threshold value, writing information about the determination into a memory in units of frames, and reading out the determination information from the memory in synchronization with a timing of the succeeding frame.

10. The image sensor according to claim 1, further comprising
a pixel control signal generation unit that generates the pixel control signal,
wherein the pixel control signal generation unit generates the pixel control signal by determining whether a previous output signal has a value that is a threshold value or more or is less than the threshold value, writing information about the determination into a memory in units of frames, predicting motion of an object based on a difference between information about two or more continuous frames written into the memory, writing corrected information corrected based on the predicted motion into the memory, and reading out the corrected information from the memory in synchronization with a timing of the succeeding frame.

* * * * *